(12) United States Patent
Hirama et al.

(10) Patent No.: US 11,243,334 B2
(45) Date of Patent: Feb. 8, 2022

(54) ANTIREFLECTIVE STRUCTURE

(71) Applicant: Oji Holdings Corporation, Tokyo (JP)

(72) Inventors: Satoru Hirama, Tokyo (JP); Kei Shinotsuka, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 115 days.

(21) Appl. No.: 16/636,265

(22) PCT Filed: Aug. 22, 2018

(86) PCT No.: PCT/JP2018/030892
§ 371 (c)(1),
(2) Date: Feb. 3, 2020

(87) PCT Pub. No.: WO2019/044598
PCT Pub. Date: Mar. 7, 2019

(65) Prior Publication Data
US 2020/0183055 A1 Jun. 11, 2020

(30) Foreign Application Priority Data
Sep. 1, 2017 (JP) .............................. JP2017-168943

(51) Int. Cl.
*G02B 1/118* (2015.01)
*G02B 5/00* (2006.01)
*G02B 5/02* (2006.01)

(52) U.S. Cl.
CPC .............. *G02B 1/118* (2013.01); *G02B 5/003* (2013.01); *G02B 5/021* (2013.01); *Y10T 428/24355* (2015.01)

(58) Field of Classification Search
CPC ...... G02B 5/02; G02B 5/0221; G02B 5/0231; G02B 5/021; G02B 1/118; G02B 5/003; Y10T 428/24355
See application file for complete search history.

(56) References Cited

U.S. PATENT DOCUMENTS

| | | | |
|---|---|---|---|
| 5,482,486 A | 1/1996 | Vaudaine et al. | |
| 2007/0031639 A1* | 2/2007 | Hsu | C25D 11/04 428/141 |
| 2013/0182328 A1* | 7/2013 | Stewart | G02B 1/18 359/580 |

FOREIGN PATENT DOCUMENTS

| | | |
|---|---|---|
| CN | 102855817 A | 1/2013 |
| CN | 103813994 A | 5/2014 |
| JP | 55-036279 A | 3/1980 |
| JP | 06-179784 A | 6/1994 |
| JP | 09-019935 A | 1/1997 |
| JP | 10-287743 A | 10/1998 |

(Continued)

OTHER PUBLICATIONS

Office Action in Chinese Patent Application No. 201880055595.7, dated Feb. 2, 2021.

(Continued)

*Primary Examiner* — Nancy R Johnson
(74) *Attorney, Agent, or Firm* — Knobbe Martens Olson & Bear LLP

(57) ABSTRACT

An anti-reflection structure having multiple bottomed tubular light absorption units that each have a bottom part having a substantially circular outer edge part and a wall part that is arranged upright along the outer edge part, an opening being formed above the bottom part, the anti-reflection structure satisfying specific conditions.

8 Claims, 11 Drawing Sheets

(56) References Cited

FOREIGN PATENT DOCUMENTS

| | | |
|---|---|---|
| JP | 2003-262704 A | 9/2003 |
| JP | 2004-210853 A | 7/2004 |
| JP | 2005-145995 A | 6/2005 |
| JP | 2011-049473 A | 3/2011 |
| JP | 2011-107412 A | 6/2011 |
| JP | 2013-025208 A | 2/2013 |
| JP | 5162585 B | 3/2013 |
| JP | 2013-532748 A | 8/2013 |
| JP | 2013-254026 A | 12/2013 |
| JP | 2013-257314 A | 12/2013 |
| JP | 2014-025023 A | 2/2014 |
| JP | 2014-062194 A | 4/2014 |
| JP | 2014-123077 A | 7/2014 |
| JP | 2015-220493 A | 12/2015 |
| JP | 2016-018081 A | 2/2016 |
| JP | 2017-088661 A | 5/2017 |
| WO | WO 2009/069725 A1 | 6/2009 |
| WO | WO 2016/084745 A1 | 6/2016 |
| WO | WO 2017/094720 A1 | 6/2017 |
| WO | WO 2018/139359 A1 | 8/2018 |

OTHER PUBLICATIONS

International Search Report issued in International Application No. PCT/JP2018/030892, dated Nov. 27, 2018.
International Preliminary Report on Patentability issued in International Application No. PCT/JP2018/030892, dated Dec. 10, 2019.
Search Report in European Patent Application No. 18852363.3, dated Jul. 16, 2021.
Office Action in Taiwanese Application No. 107129947, dated Aug. 27, 2021.

* cited by examiner

DIAMETER (μm)

ANTIREFLECTIVE STRUCTURE

TECHNICAL FIELD

The present invention relates to an antireflective structure. The present application claims priority to JP 2017-168943 filed on Sep. 1, 2017, the contents of which are incorporated by reference herein.

BACKGROUND ART

In the related art, there is disclosed a technology for forming an antireflective structure including a diffraction pattern or fine recesses and protrusions on a surface of an optical disc such as a CD or a DVD or a surface of a lens, a protective film, or the like for the purpose of preventing reflection of light in the surface (for example, Patent Document 1).

CITATION LIST

Patent Literature

Patent Document 1: JP 5162585 B

SUMMARY OF INVENTION

Technical Problem

In Patent Document 1, as an antireflective recess and protrusion structure, there is proposed a structure in which a diffraction pattern has a difference in the height between a protrusion portion and a recess portion being not less than 1.5 μm and a pitch interval of fine protrusion portions formed on a surface of the diffraction pattern is as narrow as not more than 250 nm. However, the antireflection performance of the structure is not necessarily sufficient, and a structure having more excellent antireflection performance is required.

The present invention provides an antireflective structure having excellent antireflection performance

Solution to Problem

[1] An antireflective structure including a plurality of light absorbing units each having a bottomed cylindrical shape and including a bottom portion including an outer edge portion having a substantially circular shape, a wall portion rising along the outer edge portion, and an opening portion formed above the bottom portion, wherein the following conditions <A> and <B> are satisfied:

<A> the antireflective structure is observed from a bird's-eye view along a height direction of the light absorbing units to arbitrarily set a square region including 200 to 300 light absorbing units, and for each of the light absorbing units located across two diagonals of the square, a diameter of the smallest circle including the opening portion is measured by 0.05 μm increments; the measurement processing is performed on five regions not overlapping with one another, and an average opening diameter (Dave) of the opening portions determined as an arithmetic mean of all the measured diameters satisfies the following Formula (1):

$$1\ \mu m \leq Dave \leq 10\ \mu m;\qquad\text{Formula (1)}$$

<B> the average opening diameter (Dave) and a maximum diameter (Dmax) and a minimum diameter (Dmin) satisfy the following Formula (2):

$$0.1 \leq (Dmax - Dmin)/Dave \leq 0.5 \qquad\text{Formula (2)}$$

where values of the maximum diameter (Dmax) and the minimum diameter (Dmin) in Formula (2) are a maximum value and a minimum value of diameters having the number of the smallest circles being not less than 10% with respect to the number of the smallest circles having the most frequent value as indicated in an opening diameter distribution chart for each of the smallest circles measured in the <A>, the opening diameter distribution chart including a horizontal axis indicating a diameter of each of the smallest circles measured in the <A> and a vertical axis indicating the number of the smallest circles having the respective diameters.

[2] The antireflective structure according to [1], wherein, in the opening diameter distribution chart, one peak is observed for the number of the smallest circles being not less than 10% with respect to the number of the smallest circles having the most frequent value.

[3] The antireflective structure according to [1], wherein, in the opening diameter distribution chart, two or more peaks are observed for the number of the smallest circles being not less than 10% with respect to the number of the smallest circles having the most frequent value.

[4] The antireflective structure according to [3], wherein, with respect to the two or more peaks, a difference between the diameter at the peak having the minimum diameter and the diameter at the peak having the maximum diameter is not less than 0.3 μm and not more than 1.5 μm.

[5] The antireflective structure according to any one of [1] to [4], wherein an average height of the wall portion is not less than 5 μm and not more than 100 μm.

[6] The antireflective structure according to any one of [1] to [5], wherein, in the bottom portion, minute projection structures clustered in a group at an average pitch of not less than 10 nm and not more than 500 nm are formed.

[7] The antireflective structure according to [6], wherein an average height of the minute projections is not less than 0.1 μm and not more than 4 μm.

Advantageous Effects of Invention

The antireflective structure of the present invention has excellent antireflection performance

DESCRIPTION OF EMBODIMENTS

Antireflective Structure

Figure 1:
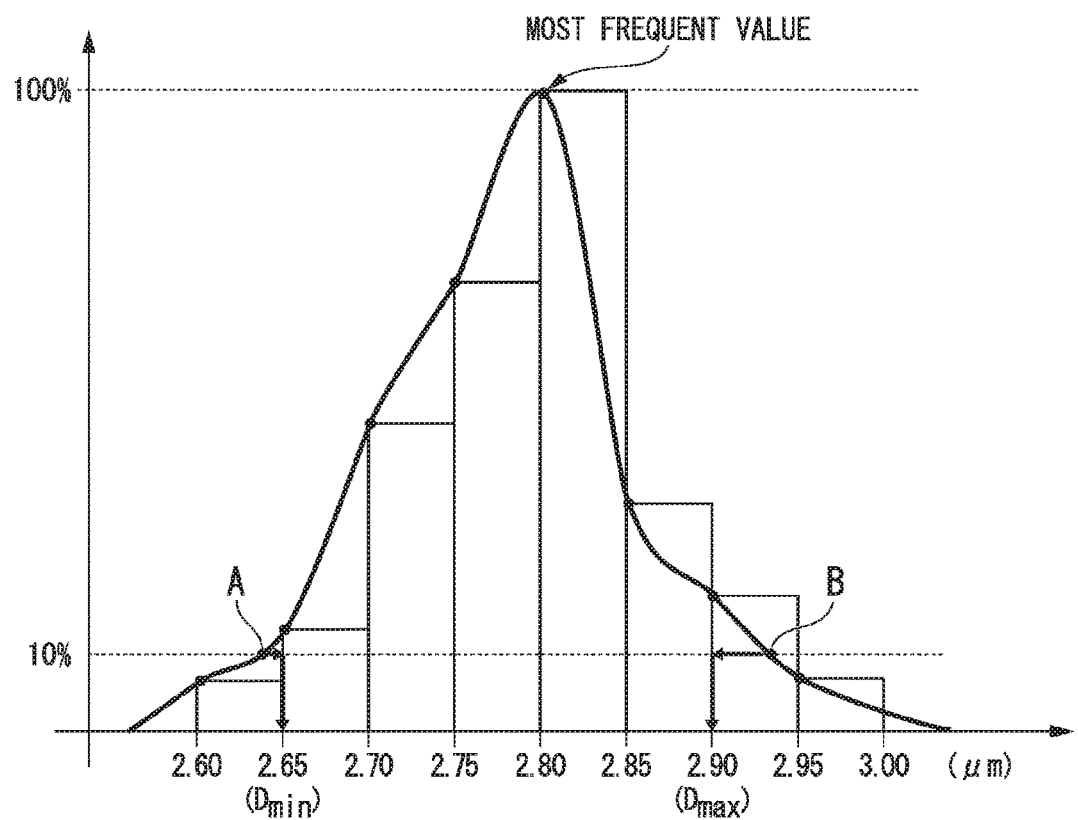
FIG. 1 is an opening diameter distribution chart for an example of an antireflective structure of the present invention.

An antireflective structure according to a first aspect of the present invention is an antireflective structure including a plurality of light absorbing units each having a bottomed cylindrical shape and including a bottom portion including an outer edge portion having a substantially circular shape, a wall portion rising along the outer edge portion, and an opening portion formed above the bottom portion, wherein the following conditions <A> and <B> are satisfied. Here, "above" means an upward direction perpendicular to a bottom surface constituting the bottom portion of the antireflective structure, and does not necessarily mean the vertical upward direction.

<A>

The antireflective structure is observed from a bird's-eye view along a height direction of the light absorbing units to arbitrarily set a square region including 200 to 300 light absorbing units, and for each of the light absorbing units located across two diagonals of the square, a diameter of the smallest circle including the opening portion is measured by 0.05 μm increments. The measurement processing is performed on five regions not overlapping with one another, and an average opening diameter (Dave) of the opening portions determined as an arithmetic mean of all the measured diameters satisfies the following Formula (1), $$1\ \mu m \le Dave \le 10\ \mu m. \quad \text{Formula (1)}$$

<B>

The average opening diameter (Dave) and a maximum diameter (Dmax) and a minimum diameter (Dmin) satisfy the following Formula (2), $$0.1 \le (Dmax - Dmin)/Dave \le 0.5 \quad \text{Formula (2)}$$

where values of the maximum diameter (Dmax) and the minimum diameter (Dmin) in Formula (2) are a maximum value and a minimum value of diameters having the number of the smallest circles being not less than 10% with respect to the number (100%) of the smallest circles having the most frequent value as indicated in an opening diameter distribution chart for each of the smallest circles measured in the <A>, the opening diameter distribution chart including a horizontal axis indicating a diameter of each of the smallest circles measured in the <A> and a vertical axis indicating the number of the smallest circles having the respective diameters.

Formula (1) is satisfied, and thus, an antireflective effect is sufficiently obtained. From the perspective of further obtaining this effect, a lower limit of Formula (1) is preferably 1.5 μm, more preferably 2.0 μm, even more preferably 2.5 μm, and an upper limit of Formula (1) is preferably 5.5 μm, more preferably 5.0 μm, and even more preferably 4.5 μm. A combination of the lower limit and the upper limit is preferably from 1.5 to 5.5 μm, more preferably from 2.0 to 5.0 μm, and even more preferably from 2.5 to 4.5 μm.

Formula (2) is satisfied, and thus, a domain (localized two-dimensional crystallized region in which structures or particles are arranged in the same direction) in an antireflective surface where opening portions are densely arranged is less likely to be present, and optical interference light due to the domain (phenomenon in which glaring intense interference light is partially generated) can be suppressed. In addition, fewer defects of the wall portion constituting the opening portion is generated, and antireflection performance is improved.

A coefficient (0.1) on the lower limit side in Formula (2) is more preferably 0.15. When the coefficient is the suitable value described above, a domain is less likely to be present, and optical interference due to the domain can be suppressed more easily.

A coefficient (0.5) on the upper limit side in Formula (2) is more preferably 0.45. When the coefficient is the suitable value described above, fewer defects of the wall portion is generated, and antireflection performance is further improved. A combination of the coefficients on the lower limit side and the upper limit side is preferably 0.1 and 0.45 or 0.15 and 0.5 and more preferably 0.15 and 0.45.

In the opening diameter distribution chart, the values of the maximum diameter (Dmax) and the minimum diameter (Dmin) in Formula (2) are the maximum value and the minimum value of the diameters having the number of the smallest circles being not less than 10% with respect to the number (100%) of the smallest circles having the most frequent value, more preferably being not less than 20% and even more preferably not less than 30% with respect to the number of the smallest circles having the most frequent value. In the above-described suitable ranges, a proportion of structures having different opening diameters increases, and an array having randomness can be obtained more easily.

The minimum diameter (Dmin) preferably satisfies the following Formula (3).

$$Dmin = \alpha \times Dave \text{(where } 0.75 < \alpha < 1.0) \quad \text{Formula (3)}$$

In the above-described range, antireflection performance is further improved.

From the perspective of further obtaining the effect described above, a lower limit of α in Formula (3) is preferably more than 0.78 and more preferably more than 0.80. That is, 0.78<α<1.0 is preferable and 0.80<α<1.0 is more preferable.

The maximum diameter (Dmax) preferably satisfies the following Formula (4).

$$Dmax = \beta \times Dave \text{ (where } 1.0 < \beta < 1.3)\quad \text{Formula (4)}$$

In the above-described range, antireflection performance is further improved.

From the perspective of further obtaining the effect described above, an upper limit of β in Formula (4) is preferably less than 1.25, and more preferably less than 1.20. That is, 1.0<β<1.25 is preferable and 1.0<β<1.20 is more preferable.

In the opening diameter distribution chart, two or more peaks are preferably observed for the number of the smallest circles being not less than 10% with respect to the number of the smallest circles having the most frequent value. From the perspective of preventing optical interference due to the domain, the number of the peaks is preferably two or more and more preferably three or more. Here, the peak means an apex (top).

With respect to the two or more peaks, a lower limit of a difference between the diameter at the peak having the minimum diameter and the diameter at the peak having the maximum diameter (that is, among the peaks observed for the number of the smallest circles being not less than 10%, a difference between a horizontal axis value at the leftmost peak and a horizontal axis value at the rightmost peak) is preferably not less than 0.3 μm, more preferably not less than 0.4 μm, and even more preferably not less than 0.5 μm. When the lower limit is not less than 0.3 μm, arrangement of the opening portions of the light absorbing units packed in a two-dimensional plane of the antireflective structure is not excessively regularized and has moderate randomness. Thus, formation of the domain can be prevented more easily.

An upper limit of the difference is preferably not more than 1.5 μm and more preferably not more than 1.0 μm. When the upper limit is not more than 1.5 μm, the opening portions of the light absorbing units can be packed sufficiently and arranged densely in the two-dimensional plane of the antireflective structure, and antireflection performance can further be improved. A combination of the lower limit and the upper limit of the difference is preferably from 0.3 to 1.5 μm, more preferably from 0.4 to 1.0 μm, and even more preferably from 0.5 to 1.0 μm.

The opening diameter distribution chart can be created by using an electron microscopy image in which the antireflective structure is looked down along the height direction of the light absorbing units. FIG. 1 to FIG. 5 show an example of an opening diameter distribution chart created by the above-described method for the antireflective structure according to the present invention.

The opening diameter distribution is a distribution curve obtained by smoothly connecting minimum values in respective sections in a histogram in which a horizontal axis indicates a diameter of the smallest circle (corresponding to the opening diameter of the opening portion) by 0.05 μm increments, whereas a vertical axis indicates the number of the smallest circles having the respective diameters (see FIG. 1). FIG. 1 shows an example of a histogram and a distribution curve of the histogram and a plot of the minimum values in the respective sections.

A method for determining the minimum diameter (Dmin) and the maximum diameter (Dmax) from the distribution curve in FIG. 1 will be described next. First, a vertical axis value of the most frequent value of the distribution curve is set as 100%, and a line (dotted line) is drawn by shifting the horizontal axis up to a vertical axis value of 10% with respect to 100%. The minimum diameter (Dmin) corresponds to a value (2.65) at a right end of a section (not less than 2.60 μm and less than 2.65 μm) in which an intersection point A having the minimum horizontal value among intersection points between the dotted line and the distribution curve is present. Here, the reason for adopting the value at the right end is because the opening portions the number of which is not less than 10% with respect to the most frequent value are present in a section (not less than 2.65 μm and not more than 2.70 μm) on the right side of the section in which the intersection point A is present.

In addition, the maximum diameter (Dmax) corresponds to a value (2.90) at a left end of a section (not less than 2.90 μm and less than 2.95 μm) in which an intersection point B having the maximum horizontal value among intersection points between the line (10% dotted line) and the distribution curve is present. Here, the reason for adopting the value at the left end is because the opening portions the number of which is not less than 10% with respect to the most frequent value are present in a section (not less than 2.90 μm and less than 2.95 μm) in which the intersection point B is present.

In FIG. 2 to FIG. 5 below, for convenience, a histogram is omitted and only a distribution curve is shown.

In FIG. 2 to FIG. 5, a scale of the horizontal axis is omitted and not shown, and the vertical axis indicates the most frequent value of the number of the smallest circles in terms of 100%.

Figure 2:
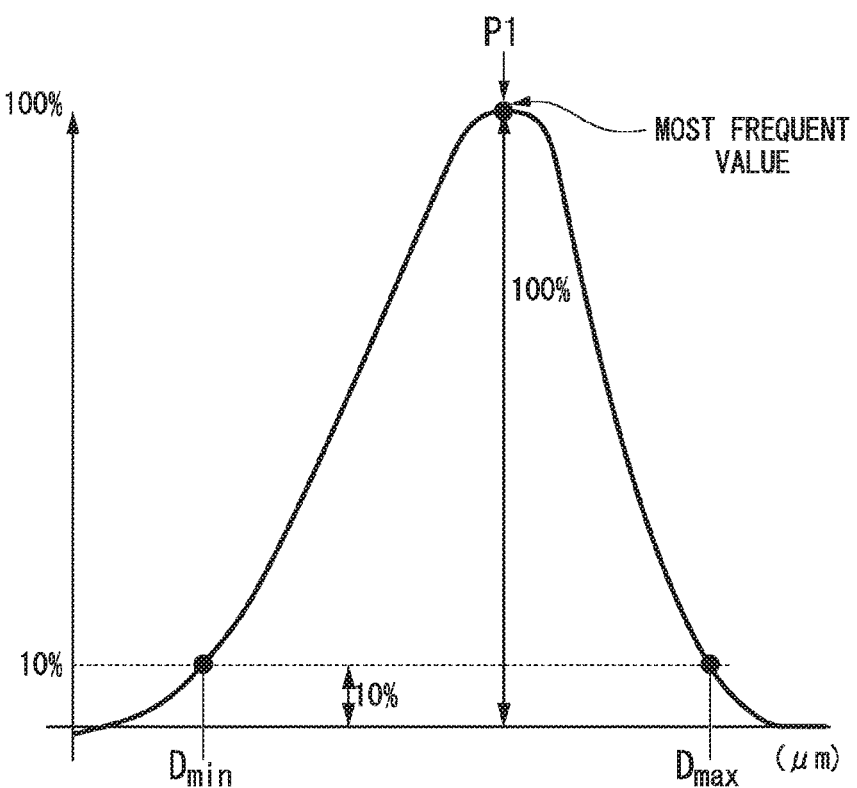
FIG. 2 is an opening diameter distribution chart relating to an example of the antireflective structure of the present invention.

FIG. 2 is a unimodal distribution chart including one peak P1, and satisfies Formulas (1) to (4) described above.

Figure 3:
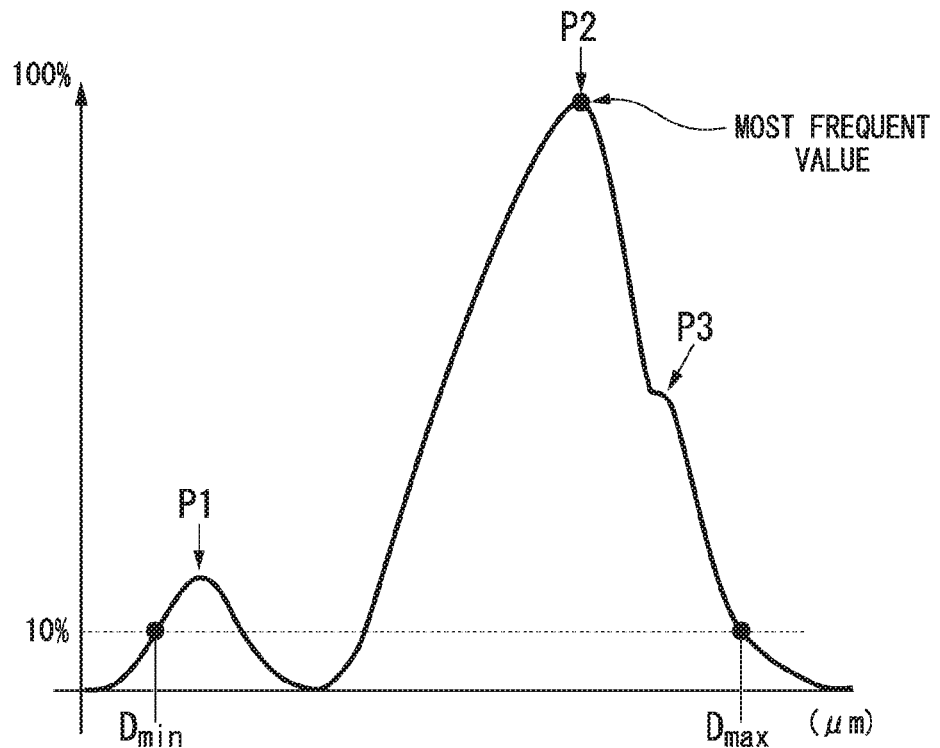
FIG. 3 is an opening diameter distribution chart relating to an example of the antireflective structure of the present invention.

FIG. 3 is a multimodal distribution chart including three peaks P1, P2, and P3 observed for the number of the smallest circles being not less than 10% with respect to the number of the smallest circles having the most frequent value, and satisfies Formulas (1) to (4) described above.

Figure 4:
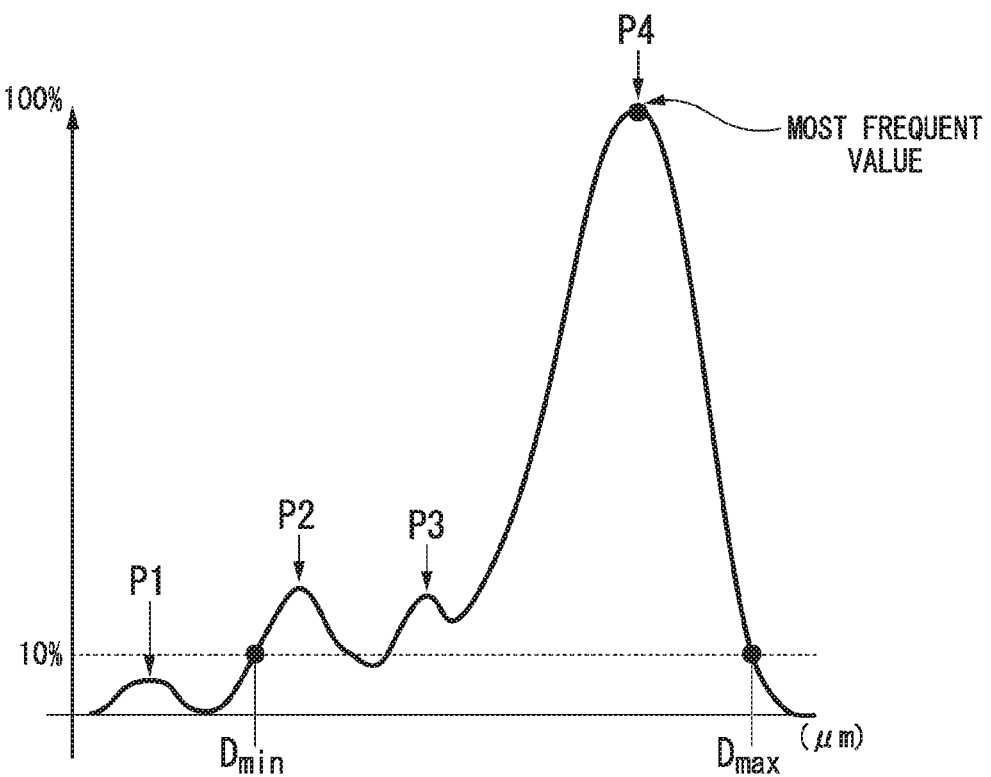
FIG. 4 is an opening diameter distribution chart relating to an example of the antireflective structure of the present invention.

FIG. 4 is a multimodal distribution chart including three peaks P2, P3, and P4 observed for the number of the smallest circles being not less than 10% and one peak P1 observed for the number of the smallest circles being less than 10% with respect to the number of the smallest circles having the most frequent value, and satisfies Formulas (1) to (4) described above. The minimum peak P1 is observed for the number of the smallest circles being less than 10%, and a horizontal axis value of the peak is smaller than the minimum diameter (Dmin).

Figure 5:
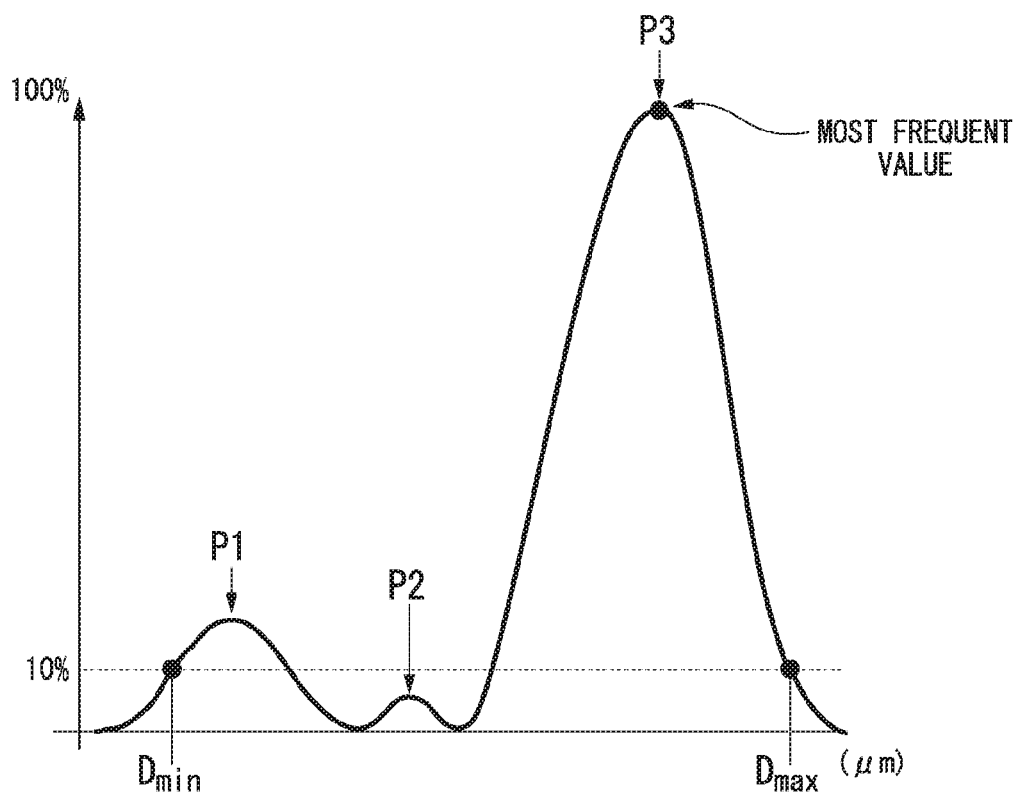
FIG. 5 is an opening diameter distribution chart for an example of the antireflective structure of the present invention.

FIG. 5 is a multimodal distribution chart including two peaks P1 and P3 observed for the number of the smallest circles being not less than 10% and one peak P2 observed for the number of the smallest circles being less than 10% with respect to the number of the smallest circles having the most frequent value, and satisfies Formulas (1) to (4) described above. A horizontal axis value of the peak P2 lies between the minimum diameter (Dmin) and the maximum diameter (Dmax).

An example of the antireflective structure according to the present invention will be described in detail below with reference to the drawings.

Figure 6:
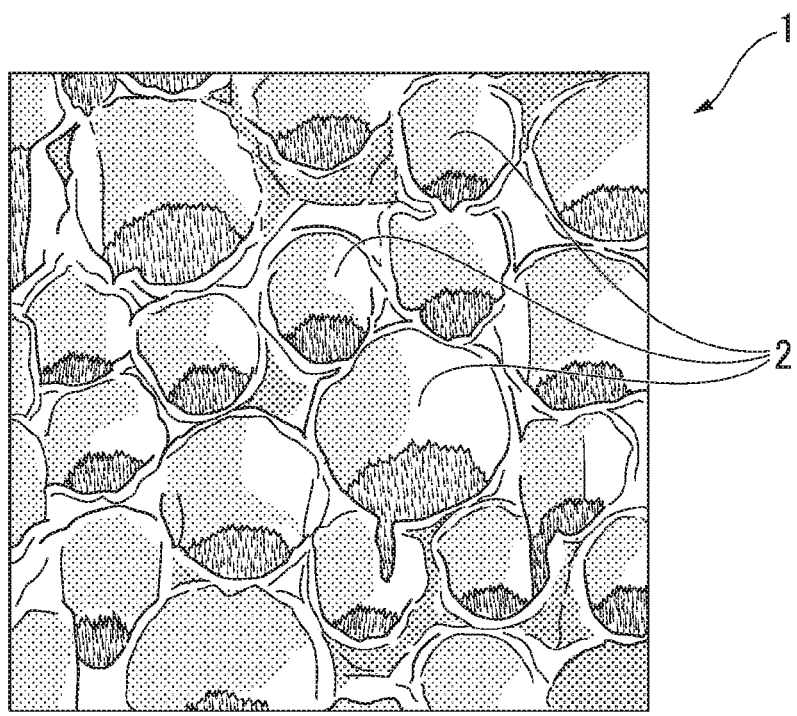
FIG. 6 is a schematic perspective view of a plurality of light absorbing units in an antireflective structure 1.

FIG. 6 is a schematic view of an antireflective structure 1 of a first embodiment of the present invention as viewed obliquely from above.

The antireflective structure 1 includes a structure in which a multiplicity of light absorbing units 2 are densely arranged adjacent to one another in a predetermined region of a surface of a resin sheet.

Each of the light absorbing units 2 is a cylindrical body including a bottom portion 2b including an outer edge portion 2a having a substantially circular shape, a wall portion 2w rising along the outer edge portion 2a, and an opening portion 2c formed above.

Here, the outer edge portion 2a corresponding to a contour of the bottom portion 2b has a substantially circular shape, and this refers to the shape of the outer edge portion 2a that may approximate a circle or an ellipse (a circle or an ellipse close to the shape of the outer edge portion 2a may be assumed) in a case where the outer edge portion 2a is looked down along the height direction of the light absorbing units 2. Further, the substantially circular shape is a shape that does not include a substantial angle.

A shape of a space (hereinafter referred to as an "inner hollow portion") enclosed by the bottom portion 2b and the wall portion 2w of the light absorbing unit 2 having a cylindrical shape may approximate a cylinder or a truncated cone. Here, the shape approximating a cylinder or a truncated cone refers to a shape in which a cylinder or a truncated cone close to the shape of the inner hollow portion may be assumed.

The inner hollow portion may have a shape having a diameter increasing upward or downward. The shape having a diameter increasing upward facilitates formation of the light absorbing units 2, and increases the area of the opening portion 2c on which light is incident to improve antireflection performance Thus, the inner hollow portion preferably has the shape having a diameter increasing upward.

Figure 7:
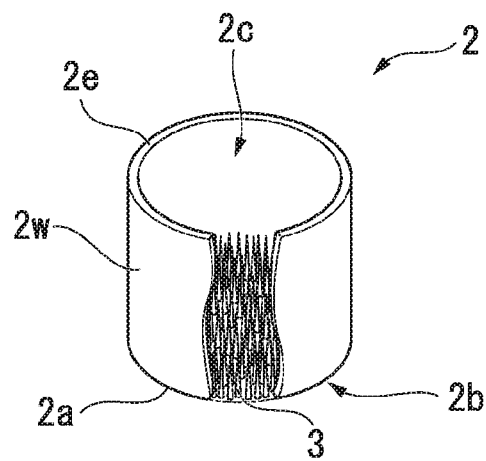
FIG. 7 is a schematic explanatory view of a light absorbing unit 2 provided in the antireflective structure 1.

As illustrated in FIG. 7, the light absorbing unit 2 includes the wall portion 2w rising along the outer edge portion 2a. The outer edge portion 2a extends along a substantially circular contour of the bottom portion 2b, and thus, when the wall portion 2w is looked from above (when the surface of the resin sheet is looked down), the wall portion 2w surrounds the bottom portion 2b to trace the outer edge portion 2a.

The wall portion 2w surrounding the outer edge portion 2a is preferably continuous along the outer edge portion 2a. When the wall portion 2w is partially chipped and discontinuous, the wall portion 2w may affect antireflection performance, and thus this is undesirable. The schematic view of FIG. 6 illustrates two chipped portions for convenience of description. In a case where the wall portion 2w surrounding the outer edge portion 2a is partially chipped and discontinuous, the inner hollow portions of two light absorbing units adjacent to each other may be in communication in that chipped portion.

The height direction of the wall portion 2w extends along the normal direction of the surface of the resin sheet, that is, the height direction of a cylindrical body. A lower end of the wall portion 2w is firmly supported by the bottom portion 2b of the light absorbing unit 2, and an upper end of the wall portion 2w forms the opening portion 2c of the light absorbing unit 2. Hereinafter, an edge on the inner side of the upper end of the opening portion 2c is referred to as an opening edge 2e.

Figure 8:
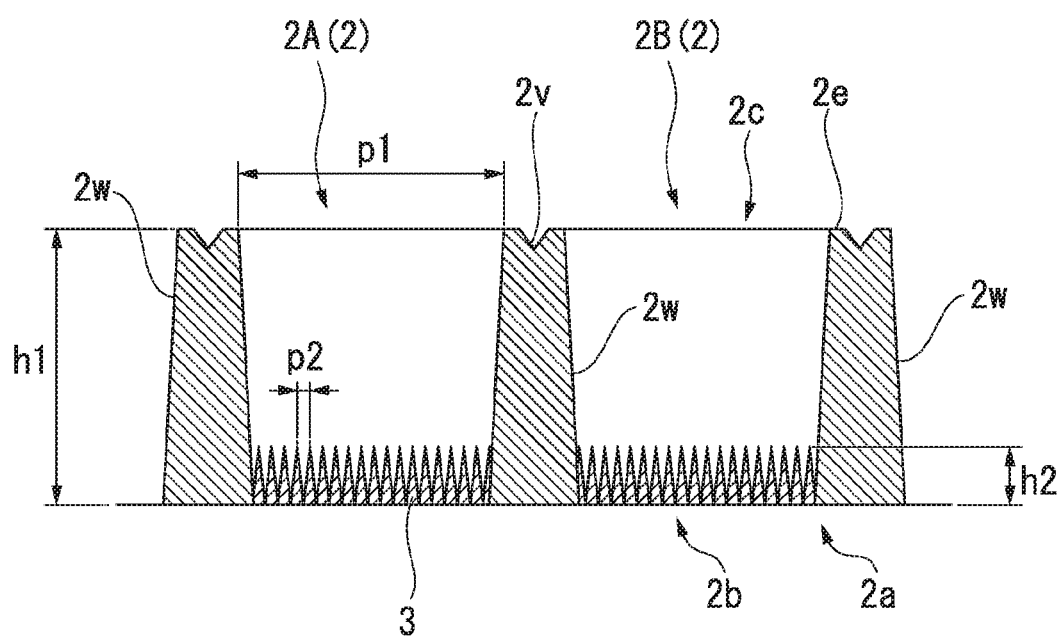
FIG. 8 is a schematic cross-sectional view of two light absorbing units 2 adjacent to each other in the antireflective structure 1 cut along a height direction.

FIG. 8 shows a cross-sectional schematic view of two light absorbing units 2 adjacent to each other and provided in the antireflective structure 1, taken along the height direction of the light absorbing units 2.

As illustrated in this schematic view, an opening diameter p of the opening portion 2c is a distance across the opening edge 2e, and an average opening diameter (Dave) that is an average value of the opening diameters p1 is not less than 1 µm and not more than 10 µm. The antireflective structure 1 satisfies the conditions <A> and <B> described above.

Figure 9:
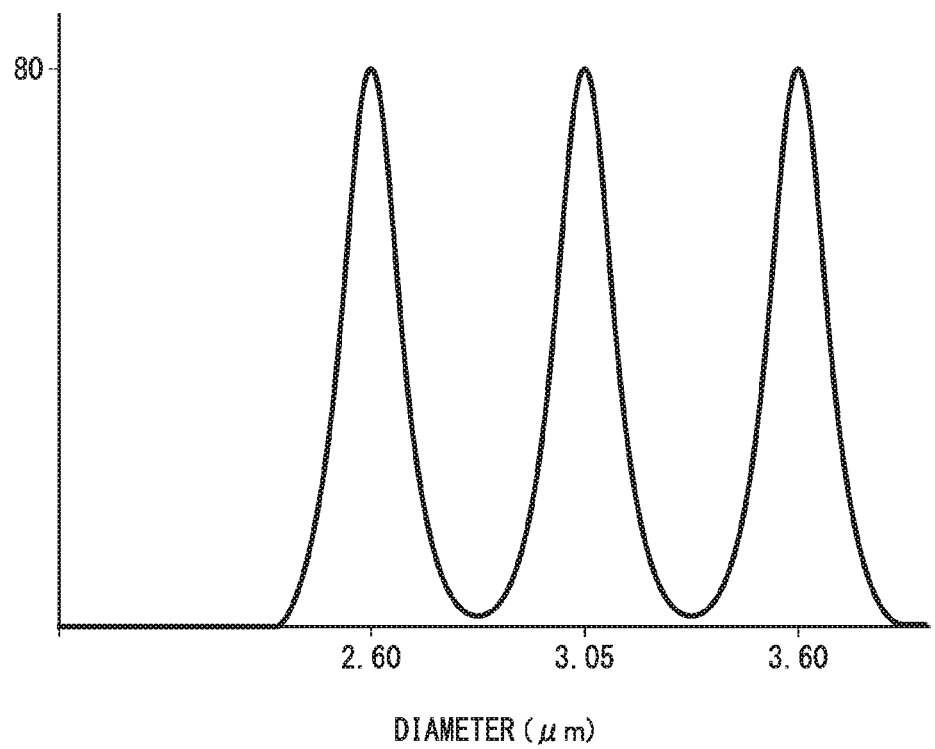
FIG. 9 is a distribution chart showing a distribution of opening diameters of the respective light absorbing units 2 provided in the antireflective structure 1.

FIG. 9 shows an opening diameter distribution chart created by the above-described method for the antireflective structure 1 illustrated in FIG. 6.

In FIG. 9, a peak is observed at each of positions of diameters of 2.60 µm, 3.05 µm, and 3.60 µm on the horizontal axis. This means that the antireflective structure 1 includes three types of light absorbing units 2 having opening diameters of approximately 2.60 µm, 3.05 µm, and 3.60 µm.

An aperture ratio of the antireflective structure 1 is defined as follows. First, the antireflective structure 1 is observed under an electron microscope to observe the antireflective structure 1 from a bird's-eye view along a height h1 direction of the light absorbing unit 2, and five square regions each including 200 to 300 light absorbing units 2 are arbitrarily set. The aperture ratio is defined as a percentage of the total area of the opening portions 2c of all the light absorbing units 2 present in the five regions with respect to the whole area (100%) of the regions. Here, the area of the opening portion 2c of each light absorbing unit 2 is determined by visually checking or executing image processing on the area of a region enclosed by the opening edge 2e of each light absorbing unit 2. In a case where the wall portion 2w continuously surrounding the above-described region is partially chipped, the above-described area is determined assuming that the opening edge 2e is present continuously in the chipped site.

The aperture ratio is preferably 40 to 85%, more preferably 50 to 85%, and even more preferably 55 to 85%.

When the aperture ratio is not less than the lower limit of the above-described range, antireflection performance is further improved. From the perspective of further improving these effects, the upper limit of the above-described range is preferably larger. However, the upper limit of 100% is not possible, and approximately 85% is considered to be a substantial limit.

As illustrated in FIG. 8, wall portions 2w of a first light absorbing unit 2A(2) and a second light absorbing unit 2B(2) provided in the antireflective structure 1 separate the first light absorbing unit 2A(2) from the second light absorbing unit 2B(2) and are integrated together. In a central portion of an upper end (top surface) of the wall portions 2w integrated together, a depression 2v is formed at a location that may be recognized as a boundary between the light absorbing units 2.

With respect to the multiplicity of light absorbing units 2 provided in the antireflective structure 1, an average of the heights h1 (average height) of the wall portions 2w is preferably not less than 5 µm and not more than 100 µm, more preferably not less than 7 µm and not more than 50 µm, and even more preferably not less than 12 µm and not more than 40 µm.

When the height h1 of the wall portion 2w is not less than 5 µm, specular reflection of incident light is sufficiently prevented, and antireflection performance achieved by the antireflective structure 1 is further improved. Note that "antireflection performance" as used herein means "antiglare performance"

When the height h1 of the wall portion 2w is not more than 100 µm, the mechanical strength of the antireflective structure 1 is sufficiently maintained.

The average height of the wall portions 2w is determined as follows.

At any position of the antireflective structure 1, a cross section is cut out along the height h1 direction of the plurality of light absorbing units 2 and observed under an electron microscope, and the height h1 of each of 200 to 300 wall portions 2w is measured, and the average height of the wall portions 2w is determined as an arithmetic mean of the heights of the 200 to 300 wall portions 2w. At this time, the height h1 of each wall portion 2w is determined as follows. That is, when a vertical distance extending from the highest top portion (apex) downward to a bottom portion on the left side of the wall portion 2w in the cross section to a first inflection point or saddle point is g1, and a vertical distance extending from the same top portion downward to a bottom portion on the right side to the first inflection point or saddle point is g2, the height h1 of each wall portion 2w is determined by h1=(g1+g2)/2. However, in a case where the depression 2v is formed in the upper end (upper surface) of the wall portion 2w, the depression 2v is ignored when the inflection point or saddle point is identified.

In the bottom portion 2b surrounded by the wall portion 2w of the light absorbing unit 2, a minute projection structure may be formed. In the minute projection structure, a multiplicity of minute projections 3 project along the height direction of the wall portion 2w to a position lower than the upper end (height) of the wall portion 2w, and are densely clustered in a group. When a valley (recess portion) is focused on, the minute projection structure can also be viewed as a structure in which a multiplicity of recess portions are densely disposed in the bottom portion 2b.

Light incident on the antireflective structure 1 enters the inner hollow portion through the opening portion 2c of the light absorbing unit 2, and is further absorbed by the minute projection structure including the minute projections 3 clustered in a group in the bottom portion 2b.

An average of a pitch p2 (average pitch) between the minute projections 3 is preferably not less than 10 nm and not more than 500 nm, and more preferably not less than 50 nm and not more than 300 nm, and even more preferably not less than 80 nm and not more than 150 nm.

When the average pitch between the minute projections 3 is not less than 10 nm and not more than 500 nm, incident light having reached the bottom portion 2b of the light absorbing unit 2 is easily absorbed into the minute projection structure, and the antireflection performance achieved by the antireflective structure 1 is further improved.

The average pitch between the minute projections 3 is determined as follows.

At any position of the antireflective structure 1, a cross section along the height direction of the plurality of light absorbing units 2 is cut out and observed under an electron microscope. For each of 10 light absorbing units 2, a pitch (distance between top portions (apexes) of the minute projections 3 adjacent to each other) between each of any 10 minute projections 3 in the bottom portion 2b of the light absorbing unit 2 and the minute projection 3 adjacent to each of the 10 minute projections 3 is measured, and the average pitch between the minute projections 3 is determined as an arithmetic mean of the pitches between these minute projections 3.

In a case where the minute projections 3 and the like collapse when the cross section of the antireflective structure 1 is cut out in the method for measuring the cross section of the antireflective structure 1 described above, the following alternative method may be adopted. That is, first, a surface of the antireflective structure 1 where the light absorbing units 2 are open is coated with a resin composition, and the resin composition is cured to produce a mold to which shapes of the light absorbing units 2 and the minute projections 3 are transferred. Then, a cross section along the height direction of the light absorbing units 2 transferred to the mold is cut out. For each of 10 light absorbing units 2, an electron microscope is used to measure a pitch between each of any 10 minute projections 3 (transferred recess portions) in the bottom portion 2b of each of the light absorbing units 2 transferred and the minute projection 3 adjacent to each of the 10 minute projections 3, and the average pitch between the minute projections 3 is determined as an arithmetic mean of the pitches between these minute projections 3.

Note that the method of measurement based on transfer to a mold may be applied as an alternative method in the case of determining an average height of the wall portions 2w, an average opening diameter of the opening portions 2c, and the like.

To cause light incident on the antireflective structure 1 to be reliably absorbed into the minute projection structure, an average of heights h2 is preferably not less than 0.2 μm and not more than 4 μm, more preferably not less than 0.2 μm and not more than 3 μm, and even more preferably not less than 0.3 μm and not more than 2 μm.

Here, the average of the heights h2 of the minute projections 3 is determined as follows.

At any position of the antireflective structure 1, a cross section along the height direction of the plurality of light absorbing units 2 is cut out and observed under an electron microscope. For each of 10 light absorbing units 2, the height h2 of each of any 10 minute projections 3 in the bottom portion 2b of each of the light absorbing units 2 is measured, and the average of the heights h2 of the minute projections 3 is determined as an arithmetic mean of the heights h2 of the 10 minute projections 3. At this time, the height h2 of each of the minute projections 3 is determined as follows. That is, when a vertical distance extending from a top portion downward to a bottom portion on the left side of the minute projection 3 in the cross section to a first inflection point or saddle point is j1, and a vertical distance extending from the top portion downward to a bottom portion on the right side of the same minute projection 3 to the first inflection point or saddle point is j2, the height h2 of each of the minute projections 3 is determined by h2=(j1+j2)/2.

In addition, the above-described method of measurement based on transfer to a mold may be adopted. In this case, a cross section along the height direction of the light absorbing units 2 transferred to a mold is cut out and observed under an electron microscope. For each of 10 light absorbing units 2, the height h2 (depth of the recess portion transferred) of each of any 10 minute projections 3 in the bottom portion 2b of each of the light absorbing units 2 transferred is measured, and the average of the heights h2 of the minute projections 3 is determined as an arithmetic mean of the heights h2 of the 10 minute projections 3. Each height h2 in this case is also determined in the same manner as described above.

To cause light incident on the antireflective structure 1 to be reliably absorbed into the minute projection structure, an occupancy ratio of the area of a region where the minute projections 3 are formed with respect to the whole area (100%) of the bottom portion 2b surrounded by the outer edge portion 2a is, for example, preferably from 70 to 100%, more preferably from 80 to 100%, and even more preferably from 90 to 100%.

The occupancy ratio of the minute projection structure in each light absorbing unit 2 can be calculated by observing the bottom portion 2b of each light absorbing unit 2 under an electron microscope, determining the whole area of the bottom portion 2b of each light absorbing unit 2, and determining, by visual check or image processing, the area of the region where the minute projection structure is formed.

With respect to any 10 light absorbing units 2 in the antireflective structure 1, the occupancy ratios are calculated, and an arithmetic mean of the occupancy ratios is determined as an average value of the occupancy ratios of the light absorbing units 2 in the antireflective structure 1.

To reliably achieve the above-described light absorption, the average value is preferably 70 to 100%, more preferably 80 to 100%, and even more preferably 90 to 100%.

Figure 10:
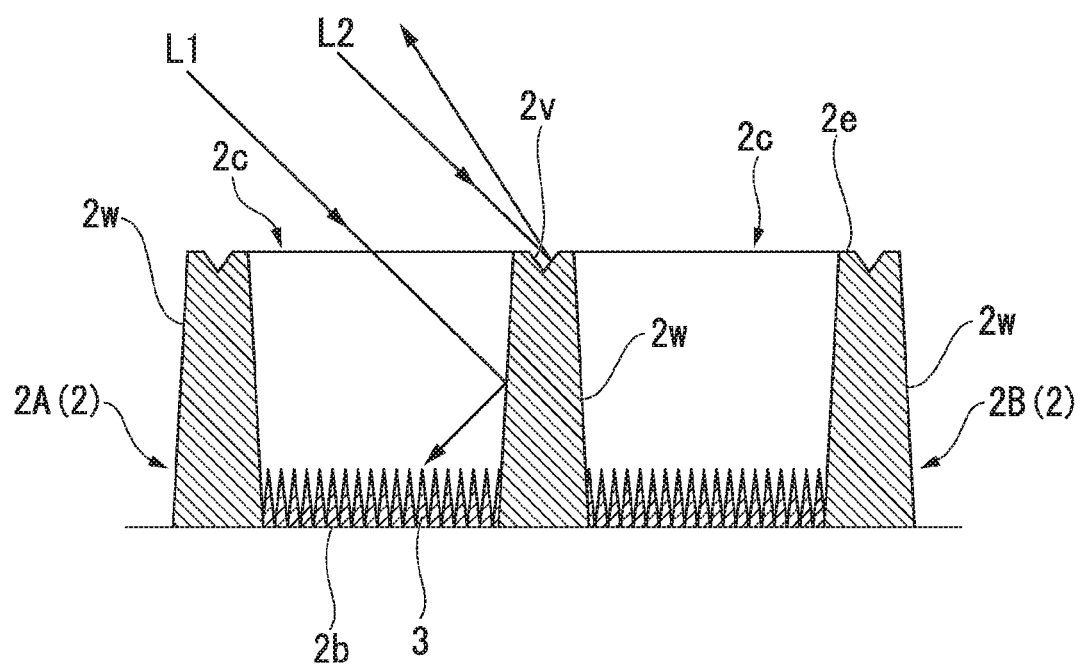
FIG. 10 is a schematic cross-sectional view of FIG. 6 illustrating a state in which light rays L1 and L2 incident on the antireflective structure 1 are absorbed or scattered.

As illustrated in FIG. 10, a light ray L1 incident on the antireflective structure 1 enters the inner hollow portion through the opening portion 2c of the light absorbing unit 2, reflects in an inner surface of the wall portion 2w, and is taken up and absorbed by the minute projection structure which has minute projections clustered in a group in the bottom portion 2b. On the other hand, a light ray L2 incident on the antireflective structure 1 is reflected in the top surface of the wall portion 2w that is a common wall portion between the first light absorbing unit 2A and the second light absorbing unit 2B.

Accordingly, as a region of a gap between the opening portions 2c of the light absorbing unit 2 adjacent to each other becomes smaller, antireflection performance is improved.

The total area of regions of gaps between the light absorbing units 2 adjacent to one another with respect to the whole area (100%) of a predetermined region where the light absorbing units 2 of the antireflective structure 1 are formed corresponds to the area obtained by subtracting the total area occupied by the opening portions 2c of the light absorbing units 2 from the whole area of the predetermined region.

As illustrated in FIG. 10, a cause of decrease of the antireflection performance of the antireflective structure 1 is reflection of the light ray L2 incident on the top surface of the wall portion 2w that is a common wall portion between the first light absorbing unit 2A and the second light absorbing unit 2B. However, in the antireflective structure 1, the depressions 2v are formed in the top surface of the antireflective structure 1, and thus at least specular reflection of the light ray L2 is prevented. The specular reflection (reflection in which an incident angle and a reflection angle are substantially the same) is prevented, and thus a part of the intended antireflection performance is achieved.

Accordingly, in a case where the antireflective structure 1 is looked down along the height h1 direction of the light absorbing units 2, and the wall portions 2w of the light absorbing units 2 adjacent to each other are integrated at the gap between the opening portions 2c of the light absorbing units 2 adjacent to each other, the upper end of the wall portions 2w integrated is preferably depressed. As viewed in a cross section cut out along the height h1 direction of the light absorbing units 2 of the antireflective structure 1, at the upper end of the wall portions 2w integrated, the depression 2v lower than the height of each of the opening edges 2e is formed.

As illustrated in FIG. 10, each of the light absorbing units 2 constituting the antireflective structure 1 includes the opening portion 2c having a substantially circular shape. Thus, regardless of an azimuth of incident light (direction of a straight line corresponding to a light ray incident on the light absorbing unit 2 as viewed from above and projected on the upper surface of the light absorbing unit 2), light incident in any of all the azimuths (360°) can be guided and absorbed in the same manner into the light absorbing unit 2 through the opening portion 2c of the light absorbing unit 2. That is, the antireflection performance achieved by the antireflective structure 1 is exhibited evenly with respect to light incident in any direction regardless of an incident azimuth of light.

Method for Manufacturing Antireflective Structure

The antireflective structure according to the present invention can be produced in large quantities by using a mold manufactured as follows, for example.

First, a surface of a substrate S to be formed into a mold is roughened by a known method such as blasting.

In regard to the degree of roughness of the surface, the surface preferably has, for example, arithmetic mean roughness Ra of approximately 0.01 μm to 0.5 μm.

Figure 11A:
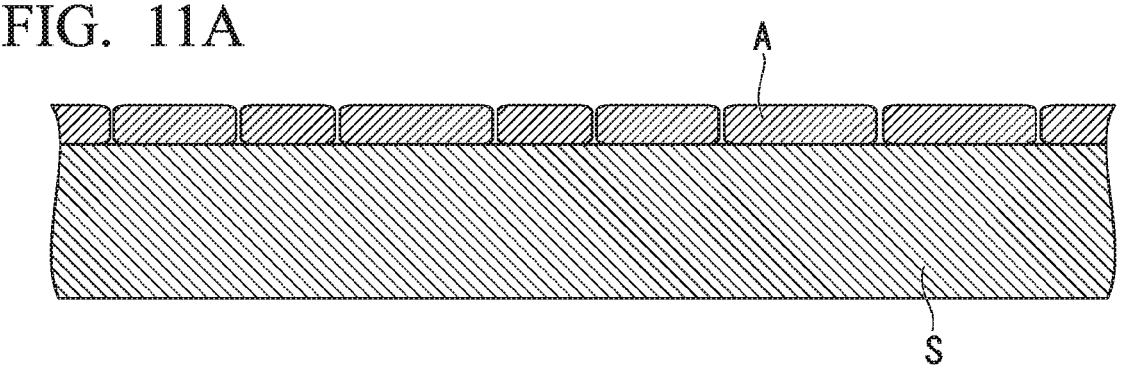
FIGS. 11A to 11D are schematic explanatory cross-sectional views of an example of a method for producing a mold for producing the antireflective structure 1.

Next, as illustrated in FIG. 11A, a multiplicity of disks A used as etching masks patterned by known photolithography or nanoimprinting are disposed on the roughened surface of the substrate S. When the disks A are looked from above, a size and a shape of each disk corresponds to the size and the shape of the opening portion 2c of the light absorbing unit 2 of the antireflective structure 1. The disks A disposed on the surface of the substrate S are densely laid while side surfaces of the disks A are not in contact with one another.

Figure 11B:
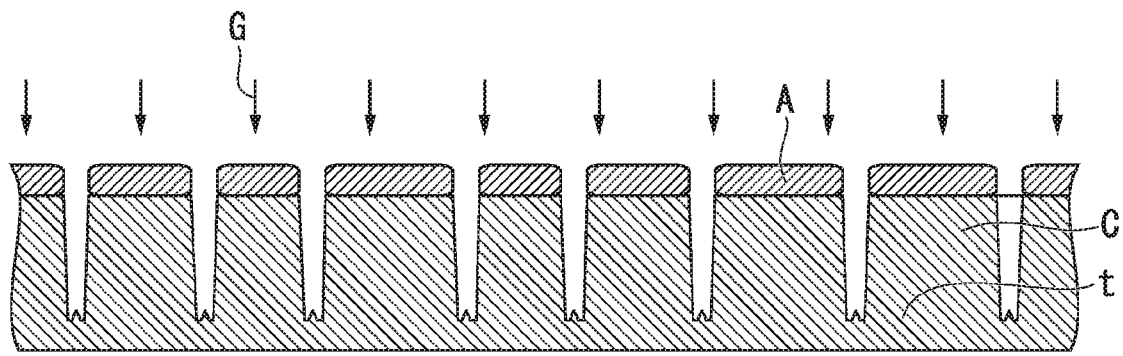

Next, as illustrated in FIG. 11B, when an etching gas G is blown from above on a layer of the disks A laid, the etching gas G blown through gaps between the disks A etches the substrate S. Note that the etching gas G includes ions and radicals ionized by using reactive gas and plasma treatment. At this time, the disks A having etching resistance are less likely to be etched, and are etched to the extent that the thickness and the diameter of each disk A slightly reduce. Thus, each disk A functions to prevent the substrate surface from being etched. As a result, sites of the substrate S located below the disks A remain substantially unetched, and thus a group of cylindrical bodies C densely clustered in a group is formed in the substrate surface, reflecting the arrangement of the disks A. In bottom portions of holes (holes formed by etching) separating the cylindrical bodies C adjacent to one another, projections t corresponding to the depressions 2v described above are formed. The protrusions t are formed based on a low etching rate below locations where the disks A are located closest to one another.

Figure 11C:
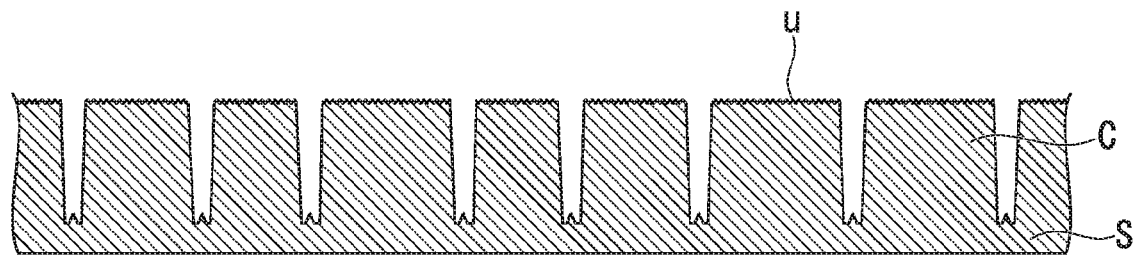

Subsequently, as illustrated in FIG. 11C, the disks A are removed from the etched substrate surface. Roughness formed by surface roughening is retained on a substrate surface u in which the disks A have been placed.

Figure 11D:
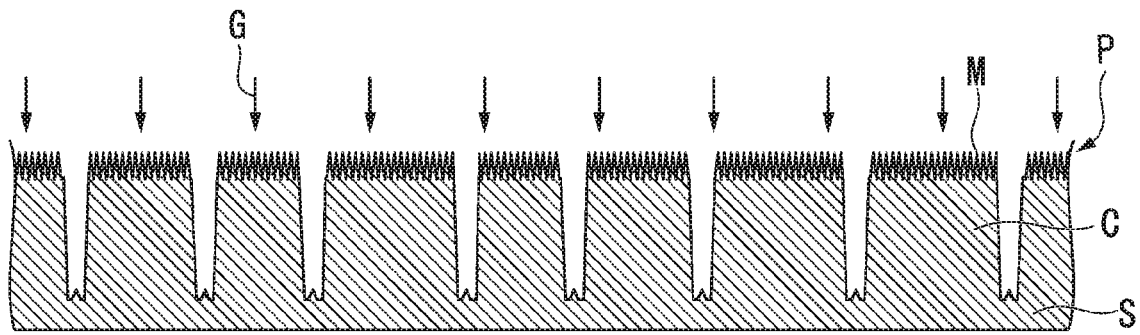

Finally, as illustrated in FIG. 11D, the etching gas G is blown on the substrate surface u obtained after the disks A have been removed and having roughness. The roughness varies an etching rate in the substrate surface u, and thus, as the etching proceeds, a group of recesses and protrusions M corresponding to the minute projection structure of the antireflective structure 1 is formed. The method described above provides an intended mold P.

The following method not using photolithography or nanoimprinting can also be exemplified as another method for producing a mold.

Figure 12A:
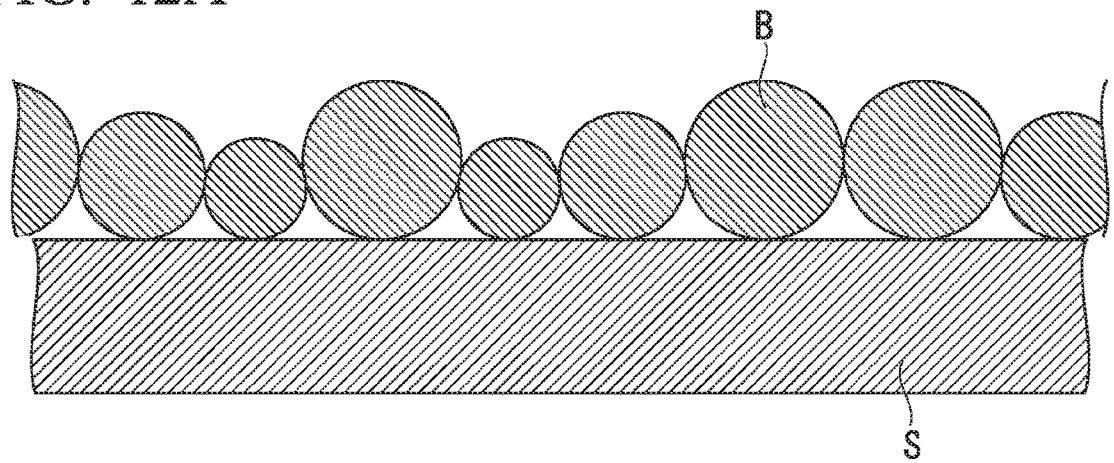
FIGS. 12A to 12D are schematic explanatory cross-sectional views of another example of the method for producing a mold for producing the antireflective structure 1.

First, as illustrated in FIG. 12A, a multiplicity of fine particles B are sprayed on the surface of the substrate S, and the fine particles B are densely laid in contact with one another. However, the fine particles B are prevented from climbing on (accumulating on) the other fine particles B or from climbing under the other fine particles B to form a layer including a single layer of the fine particles B in the substrate surface. Each of the fine particles B may have a spherical shape or a shape other than the spherical shape, for example, a spheroid. A diameter and a size of each of the fine particles B corresponds to the size of the opening portion 2c of the light absorbing unit 2 in the antireflective structure 1.

Figure 12B:
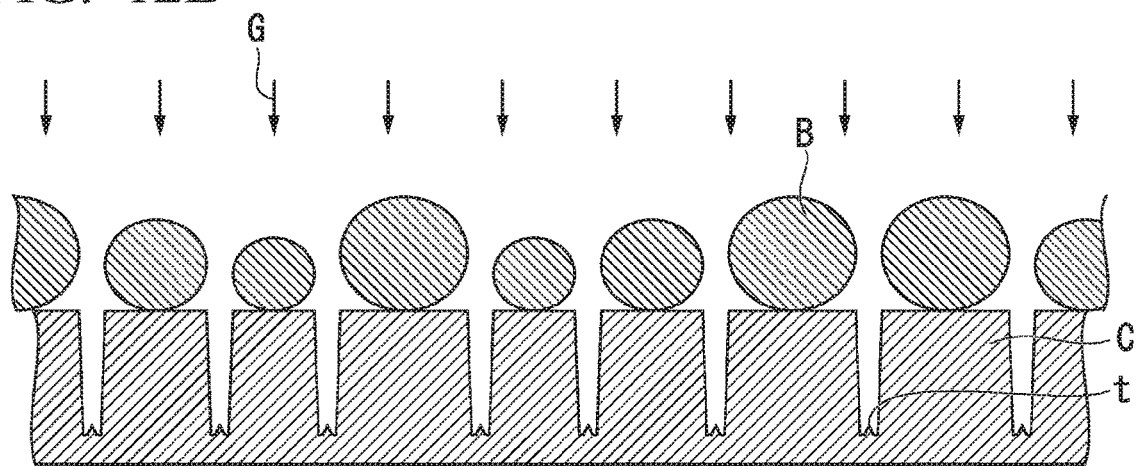

Next, as illustrated in FIG. 12B, when the etching gas G is blown from above on the layer of the fine particles B laid, the etching gas G blown through gaps between the fine particles B etches the substrate S. At this time, the fine particles B having etching resistance are less likely to be etched, and are etched to the extent that the height and the width of each particle slightly reduce. Thus, each fine particle B functions as a mask preventing the substrate surface from being etched. As a result, sites of the substrate S located below the fine particles B remain substantially unetched, and thus a group of cylindrical bodies C densely clustered in a group is formed in the substrate surface, reflecting the arrangement of the fine particles B. In bottom portions of holes (holes formed by etching) separating the cylindrical bodies C adjacent to one another, projections t corresponding to the depressions 2v described above are formed. The protrusions t are formed based on a low etching rate below contact points between the fine particles B.

Figure 12C:
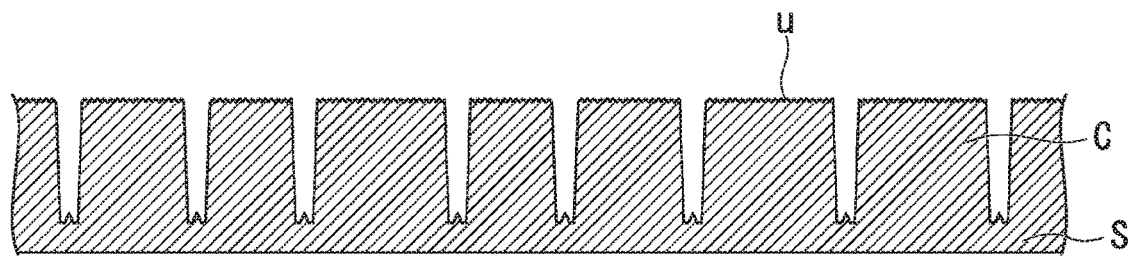
Figure 12D:
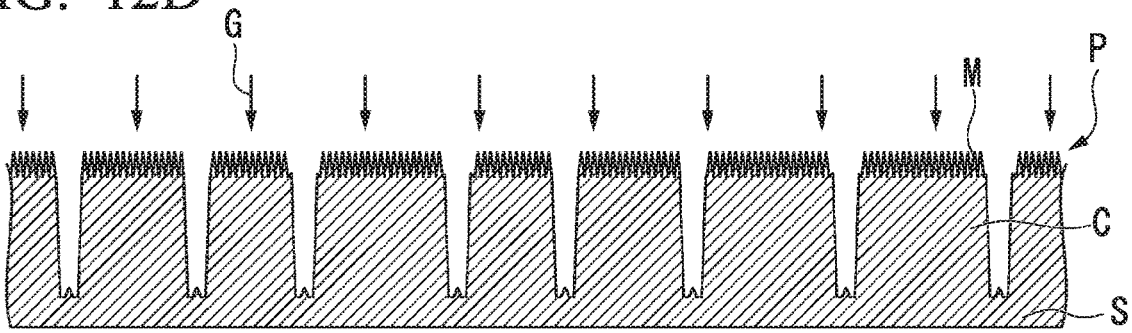

Subsequently, as illustrated in FIG. 12C, the fine particles B are removed from the etched substrate surface. At this time, normally, a substrate surface u in which the fine particles B have been placed is a rough surface having roughness. A reason for the roughness of the substrate surface u is considered that residues derived from the fine particles B remain or that the etching gas flowing around and below the fine particles B during the etching non-uniformly etches the substrate surface u. Finally, as illustrated in FIG. 12D, the etching gas G is blown on the substrate surface u obtained after the fine particles B have been removed and having roughness. The roughness varies an etching rate on the substrate surface u, and thus, as the etching proceeds, a group of recesses and protrusions M corresponding to the minute projection structure of the antireflective structure 1 is formed. The method described above provides an intended mold P.

When the multiplicity of fine particles B are densely laid in the surface of the substrate surface S as described above, it is undesirable for the fine particles B to climb on the other fine particles B, or contrary, to climb under the other fine particles B. To avoid such climbing on or under the fine particles, a particle diameter of each fine particle B used preferably satisfy the following conditions. When the following conditions are satisfied, the climbing on or under the fine particles can be prevented, and occurrence of defects of the wall portions and a domain in the antireflective structure can be prevented. Thus, the antireflection performance of the antireflective structure can further be improved.

That is, an electron microscope is used to observe and measure by 0.05 μm increments a diameter of each of 200 to 300 fine particles randomly extracted from the fine particles used in manufacture, and an average particle diameter (PSave) corresponding to an arithmetic mean of the diameters preferably satisfies the following Formula (10). Here, the diameter of the particle is the longest diameter of the particle (longest length across the particle) in an electron micrograph.

$$1\ \mu m \leq PSave \leq 10\ \mu m \qquad \text{Formula (10)}$$

In addition, the average particle diameter (PSave), a maximum diameter (PSmax), and a minimum diameter (PSmin) preferably satisfy the following Formula (20).

$$0.1 \leq (PSmax - PSmin)/Dave \leq 0.5 \qquad \text{Formula (20)}$$

Here, values of the maximum diameter (PSmax) and the minimum diameter (PSmin) in Formula (20) are a maximum value and a minimum value of diameters having the number of the fine particles being not less than 10% with respect to the number (100%) of the fine particles having the most frequent value as indicated in a particle diameter distribution chart for the diameter of each fine particle measured under an electron microscope as described above, the particle diameter distribution chart including a horizontal axis indicating the diameter of each fine particle and a vertical axis indicating the number of fine particles having the respective diameters.

Formula (10) is satisfied, and thus the antireflective structure having excellent antireflection properties can be manufactured easily. From the perspective of further obtaining this effect, a lower limit in Formula (10) is preferably 2.0 μm, more preferably 2.5 μm, and even more preferably 3.0 μm, and an upper limit in Formula (10) is preferably 6.0 μm, and more preferably 5.5 μm, and even more preferably 5.0 μm. A combination of the lower limit and the upper limit is preferably from 2.0 to 6.0 μm, more preferably from 2.5 to 5.5 μm, and even more preferably from 3.0 to 5.5 μm.

Formula (20) is satisfied, and thus formation of the domain in the antireflective surface in which the opening portions are densely arranged can be suppressed easily. In addition, Formula (20) is satisfied, and thus defects of the wall portions constituting the opening portions can further be reduced, and the antireflective structure having more excellent antireflection properties can be manufactured at high yield.

A coefficient (0.1) on the lower limit side in Formula (20) is more preferably 0.15. When the coefficient is the suitable value described above, formation of the domain can be suppressed more reliably.

A coefficient (0.5) on the upper limit side in Formula (20) is more preferably 0.45. When the coefficient is the suitable value described above, defects of the wall portions can further be reduced and a manufacturing yield can further be improved. A combination of the coefficients on the lower limit side and the upper limit side is preferably 0.1 and 0.45 or 0.15 and 0.5 and more preferably 0.15 and 0.45.

The minimum diameter (PSmin) preferably satisfies the following Formula (30).

$$PSmin = \alpha' \times PSave \text{(where } 0.75 < \alpha' < 1.0\text{)} \qquad \text{Formula (30)}$$

When the minimum diameter (PSmin) is in the range described above, the antireflective structure having excellent antireflection properties can be manufactured easily.

From the perspective of further obtaining the effect described above, a lower limit of α' in Formula (30) is preferably more than 0.78, and more preferably more than 0.80. That is, 0.78<α'<1.0 is preferable and 0.80<α'<1.0 is more preferable.

The maximum diameter (PSmax) preferably satisfies the following Formula (40).

$$PSmax = \beta' \times PSave \text{(where } 1.0 < \beta' < 1.3\text{)} \qquad \text{Formula (40)}$$

When the maximum diameter (PSmax) is in the range described above, the antireflective structure having excellent antireflection properties can be manufactured easily.

From the perspective of further obtaining the effect described above, an upper limit of β' in Formula (40) is preferably less than 1.25, and more preferably less than 1.20. That is, 1.0<β'<1.25 is preferable, and 1.0<β'<1.20 is more preferable.

The particle diameter distribution chart is a chart (distribution curve) similar to the above-described opening diameter distribution related to the antireflective structure to be manufactured.

In the particle diameter distribution chart, two or more peaks are preferably observed for the number of the fine particles being not less than 10% with respect to the number of the fine particles having the most frequent value. From the perspective of preventing optical interference due to the domain in the antireflective structure to be manufactured, the number of the peaks is preferably two or more, and more preferably three or more. Here, the peak means an apex (top).

With respect to the two or more peaks, a lower limit of a difference between the diameter at the peak having the minimum diameter and the diameter at the peak having the maximum diameter (that is, among the peaks observed for the number of the fine particles being not less than 10%, a difference between a horizontal axis value at the leftmost peak and a horizontal axis value at the rightmost peak) is preferably not less than 0.3 µm, more preferably not less than 0.4 µm, and even more preferably not less than 0.5 µm. When the lower limit is not less than 0.3 µm, the arrangement of the opening portions of the light absorbing units packed in a two-dimensional plane of the antireflective structure to be manufactured is not excessively regularized (the arrangement of the fine particles B laid in the substrate surface S is not excessively regularized) and has moderate randomness. Thus, formation of the domain can be prevented more easily.

An upper limit of the difference is preferably not more than 2.0 µm, more preferably not more than 1.5 µm, and even more preferably not more than 1.0 µm. When the upper limit is within the range described above, the opening portions of the light absorbing units can be packed sufficiently and arranged densely in the two-dimensional plane of the antireflective structure to be manufactured, and antireflection performance can further be improved. A combination of the lower limit and the upper limit of the difference is preferably from 0.3 to 2.0 µm, more preferably from 0.4 to 1.5 µm, and even more preferably from 0.5 to 1.0 µm.

Values of the maximum diameter (PSmax) and the minimum diameter (PSmin) in Formula (20) are determined from a distribution curve similarly to the Dmax and the Dmin as described above, and are a maximum value and a minimum value of diameters having the number of the fine particles being not less than 10% with respect to the number (100%) of the fine particles having the most frequent value, more preferably being not less than 20% and even more preferably not less than 30% with respect to the number of the fine particles having the most frequent value. In the above-described suitable ranges, a proportion of structures having different opening diameters increases, and an array having randomness can be obtained more easily.

Figure 13:
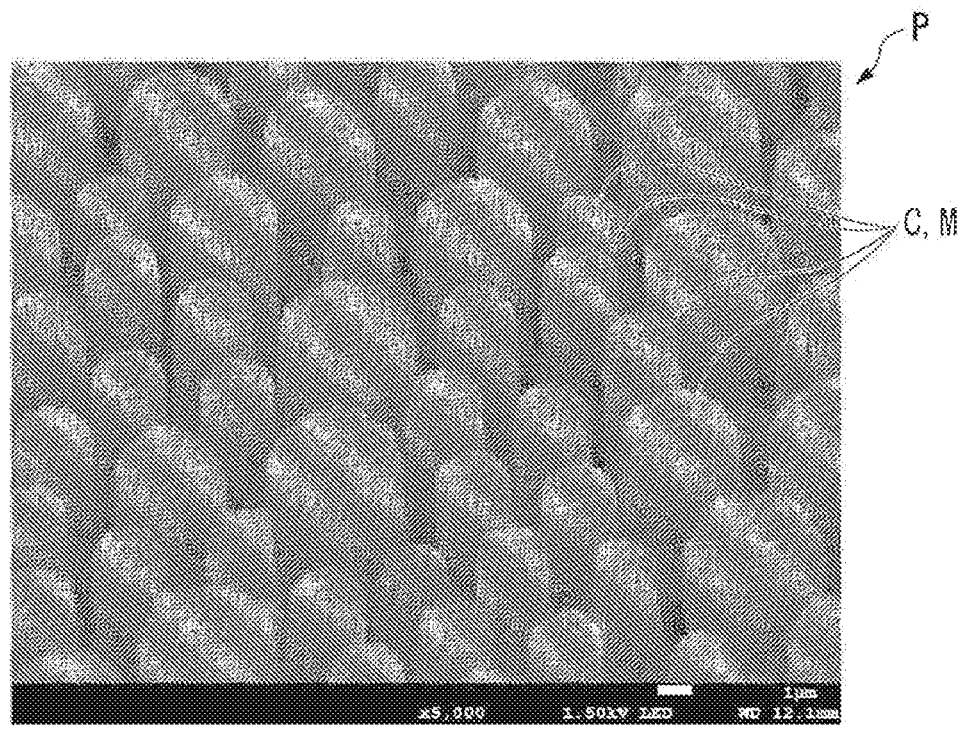
FIG. 13 is a perspective electron microscopy image of an example of a mold for producing the antireflective structure 1.

An electron micrograph of a mold produced by the method described above is illustrated in FIG. 13. A state in which the cylindrical bodies C are clustered in a group and in which the group of recesses and protrusions M is formed on an upper surface of each of the cylindrical bodies C.

Figure 14:
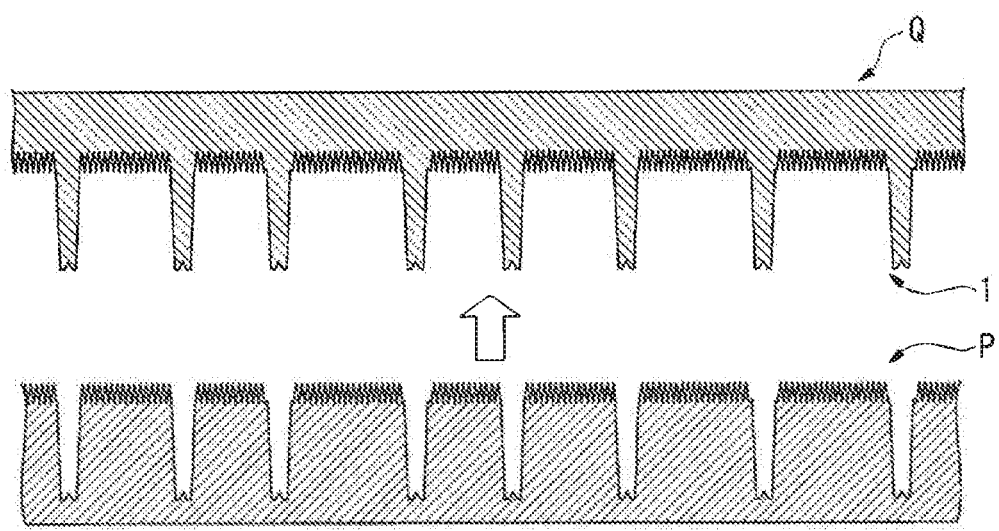
FIG. 14 is a schematic cross-sectional view illustrating a method for producing the antireflective structure 1 by using a mold.

As illustrated in FIG. 14, a mold P produced by the method described above is used to transfer and form a minute structure to and in a synthetic resin such as a thermoplastic resin, a photocurable resin, and a thermosetting resin composition by a known technique such as nanoimprinting, press molding, and injection molding. After the formation, a molded body is removed from the mold to obtain a molded body Q including the antireflective structure 1 formed on a surface of the molded body Q. Examples of a form of the molded body Q include a film, a sheet, a plate, and other molded articles.

Materials

Examples of a material of the substrate S formed into the mold P include Si, glass, and quartz. In particular, since Si has high workability as an object to be etched and is also widely used, Si is preferable.

Examples of the etching masks constituting the disks A laid in the surface of the substrate S include a photoresist. A material such as a known photosensitive functional polymeric material that enables suitable patterning and that is suitable as masks in an etching step is used. A liquid body including a resist material used in photolithography is, for example, a mixture including, as main components, a polymer, a photosensitisizer, an additive, and a solvent. Additionally, the disks A may be hard masks including an inorganic compound and formed by photolithography and reactive ion etching, or may be formed from a silicon nitride film or a silicon oxide film and formed by CVD or the like. Among the materials described above, since a photoresist enables the etching masks to be easily patterned, the photoresist is preferable.

Examples of a material of the fine particles B laid in the surface of the substrate S include metal such as Al, Au, Ti, Pt, Ag, Cu, Cr, Fe, Ni, Si, and W, and a metal oxide such as $SiO_2$, $Al_2O_3$, $TiO_2$, $MgO_2$, and $CaO_2$. In addition, other examples of a material of the fine particles B include a nitride such as SiN and TiN, a carbide such as SiC and WC, an organic polymer such as polystyrene and polymethyl methacrylate, other semiconductor materials, and an inorganic polymer. In addition, at least two types of these materials can be used in combination. Among the materials described above, from the perspective of a high degree of freedom of etch selectivity with respect to the substrate S, an inorganic oxide is preferable as the material of the fine particles B. In addition, $SiO_2$ (silica) is more preferable among the inorganic oxides.

As the etching gas used for etching the substrate S, one or more types of gas selected from the group consisting of Ar, $SF_6$, $F_2$, $CF_4$, $C_4F_8$, $C_5F_8$, $C_2F_6$, $C_3F_6$, $C_4F_6$, $CHF_3$, $CH_2F_2$, $CH_3F$, $C_3F_8$, $Cl_2$, $CCl_4$, $SiCl_4$, $BCl_2$, $BCl_3$, $BC_2$, Bra, Bra, HBr, $CBrF_3$, HCl, $CH_4$, $NH_3$, $O_2$, $H_2$, $N_2$, CO, and $CO_2$ may be used depending on the type of the substrate S. Among the gas described above, in a case where the substrate S is Si, for the reason of being commonly widely used, one or more types of gas selected from the group consisting of Ar, $SF_6$, $CF_4$, $C_2F_6$, $C_3F_6$, $C_4F_6$, $CHF_3$, $Cl_2$, $BCl_3$, $CH_4$, $NH_3$, $O_2$, $H_2$, and $N_2$ are preferable. As a method for dry etching, to accurately reflect a shape of a mask, anisotropic etching is preferable. In addition, the type of the dry etching is not particularly limited, and for example, sputter etching, plasma etching, or reactive ion etching may be used.

A material of the antireflective structure 1 is preferably a synthetic resin. Examples of the synthetic resin include a known synthetic resin such as a thermoplastic resin, a thermosetting resin, and a photocurable resin. Examples of a material suitably used can include a synthetic resin such as polyethylene terephthalate (PET), triacetyl cellulose (TAC), polycarbonate (PC), a cycloolefin polymer (COP), and an acrylic resin. In addition, examples of a shape of the antireflective structure 1 can include a film, a sheet, a plate, a block, a lens, or a sphere. The shape is not particularly limited to these shapes and can be changed depending on the use and application of the antireflective structure 1.

EXAMPLES

Example 1

A mold P including a configuration similar to the configuration of the substrate S illustrated in FIGS. 12A to 12D was produced by the following procedure. The mold was used to produce an antireflective structure by a procedure of transferring to a thermoplastic resin by thermal nanoimprinting.

Twenty mass % water dispersions containing spherical colloidal silica having three types of particle diameters corresponding to nominal diameters of 3.0 μm, 3.5 μm, and 4.0 μm were prepared. These water dispersions were mixed in a weight ratio of 1.0:1.0:1.0 to prepare a water dispersion. This water dispersion was filtered through a membrane filter having a pore size of 10 μmφ. A phenyltriethoxysilane hydrolyzate aqueous solution having a concentration of 1.0 mass % was added to the water dispersion filtered through the membrane filter. The mixture was caused to react at approximately 40° C. for 3 hours to obtain a reaction solution. At this time, the water dispersion and the hydrolyzate aqueous solution were mixed such that the mass of the phenyltriethoxysilane was 0.02 times the mass of the colloidal silica particles.

To the reaction solution obtained, methyl ethyl ketone having the volume four times the volume of this reaction solution was added, and the mixture was sufficiently stirred. Hydrophobized colloidal silica in an oil phase was extracted to obtain a hydrophobized colloidal silica dispersion having a concentration of 0.91 mass %.

The hydrophobized colloidal silica dispersion obtained was dripped at a drip rate of 0.01 mL/second to a liquid surface (water was used as lower-layer water and the water temperature was 25° C.) in a water tank (LB trough apparatus) including a surface pressure sensor measuring the surface pressure of a single particle film and a movable barrier compressing the single particle film in a direction along the liquid surface. As a substrate, an Si substrate (6 inches) including a flat surface was immersed in advance in a substantially vertical direction in the lower-layer water in the water tank. Subsequently, irradiation with ultrasonic waves (having power of 300 W and a frequency of 950 kHz) was performed through the lower-layer water toward the water surface for 10 minutes to promote two-dimensional closest-packing of the particles while volatilizing methyl ethyl ketone that is a solvent for the dispersion, and a single particle film was formed.

Then, this single particle film was compressed by the movable barrier until diffusion pressure of 25 mNm$^{-1}$ was reached, and the substrate was pulled up at a rate of 5 mm/minute to transfer the single particle film onto one surface of the substrate.

Subsequently, a hydrolyzate solution of 1 mass % monomethyltrimethoxysilane was caused to permeate as a binder the substrate on which the single particle film was formed. Subsequently, an excess of the hydrolyzate solution was removed by processing for one minute by using a spin coater (3000 rpm). Subsequently, the substrate was heated at 100° C. for 10 minutes to cause the binder to react, and the substrate with the single particle film was obtained.

The substrate with the single particle film was dry-etched by using a mixed gas of $CF_4$, $Cl_2$, and $O_2$. Etching conditions included antenna power (source power) of 1500 W, bias power of 1000 W, a gas flow of 100 sccm, and etching time of 1000 seconds. Subsequently, the etched fine particles were removed by wiping and water washing, and dry etching was performed by using $Cl_2$ gas to produce a mold P of Example 1.

The mold P of Example 1 was used to perform thermal nanoimprinting on a COP film at pressure of 6.0 MPa and treatment temperature of 150° C., and cooled to room temperature, and then an antireflective structure of Example 1 was obtained.

When the antireflective structure of Example 1 was observed under an electron microscope, wall portions of light absorbing units adjacent to each other were integrated, and an upper end of the integrated wall portions was depressed. In addition, a size and the like of each portion were determined by the above-described method and were as follows.

Figure 15:
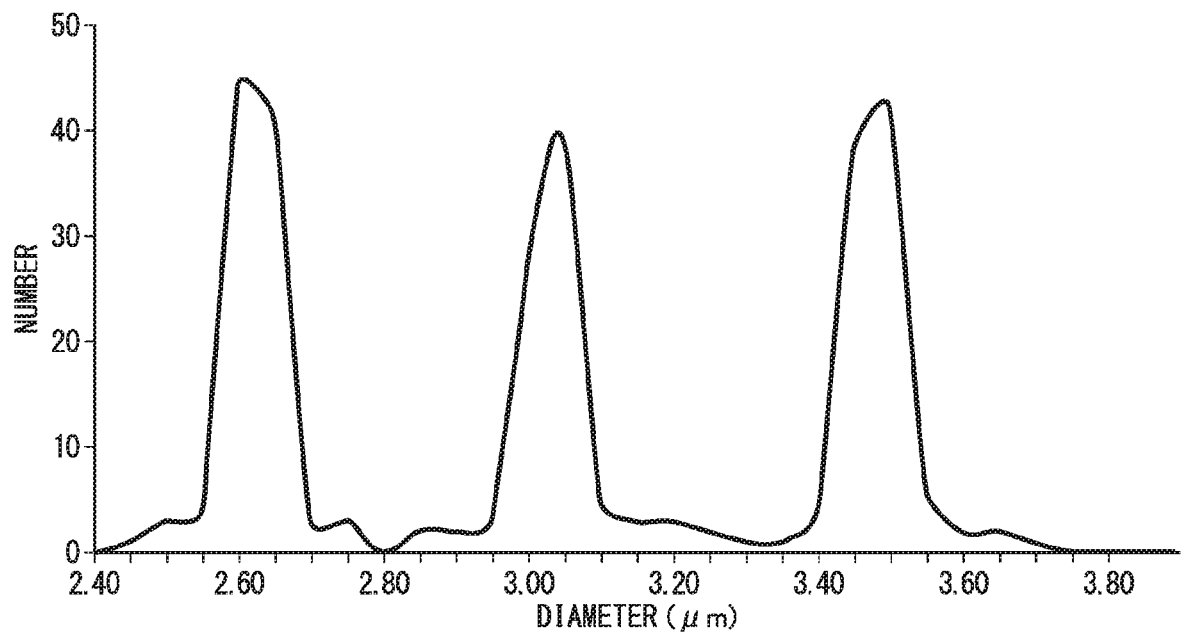
FIG. 15 is an opening diameter distribution chart of an antireflective structure produced in Example 1.

Average height of wall portions: 13.0 μm
Aperture ratio: 59.2%
Minute projection structure in bottom portion: Yes
Minute projection structure average pitch in bottom portion: 110 nm
Minute projection structure average height in bottom portion: 750 nm In addition, FIG. 15 shows an opening diameter distribution chart created by the above-described method for the antireflective structure of Example 1. Results based on the opening diameter distribution chart were as follows. The results are shown in Table 1.

Average opening diameter of opening portions (Dave): 3.06 μm
Minimum diameter in opening diameter distribution chart (Dmin): 2.60 μm
Maximum diameter in opening diameter distribution chart (Dmax): 3.55 μm $$(D\text{max} - D\text{min})/D\text{ave} = 0.310$$

The results described above satisfy Formulas (1) and (2) described above.

Figure 16:
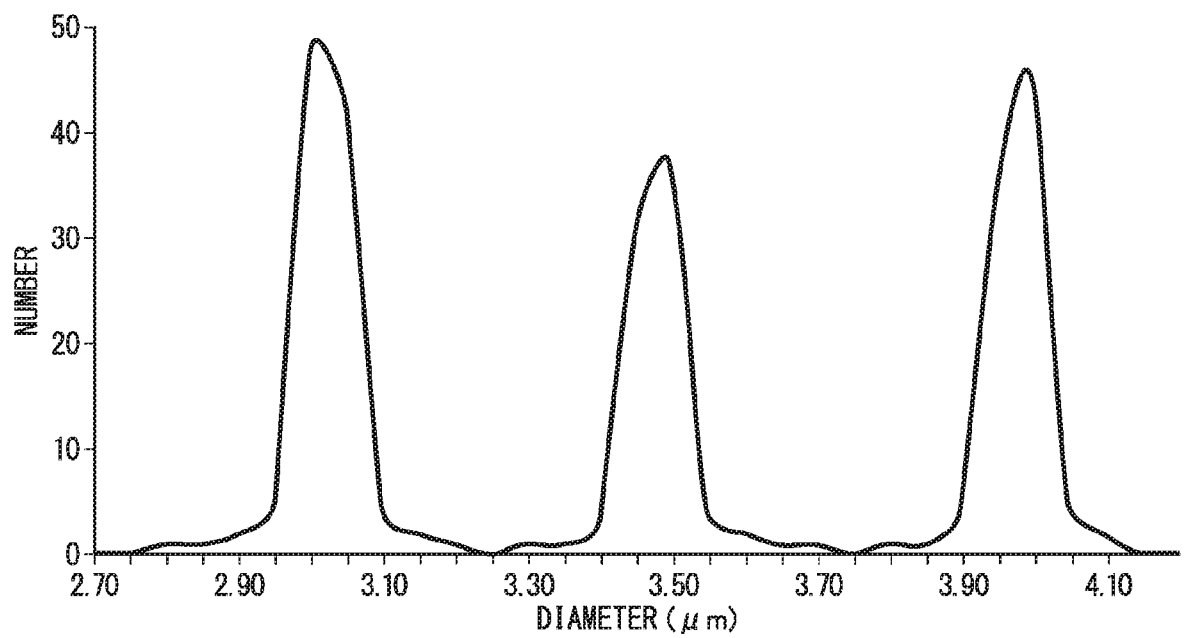
FIG. 16 is a particle diameter distribution chart of fine particles used in Example 1.

FIG. 16 shows a particle diameter distribution chart created by the above-described method for the fine particles used in Example 1. Results based on the particle diameter distribution chart were as follows.

Average particle diameter (PSave): 3.50 μm
Minimum diameter (PSmin): 2.95 μm
Maximum diameter (PSmax): 4.05 μm Comparative Example 1

A mold P of Comparative Example 1 was produced by using a method similar to the method in Example 1 except that 20 mass % water dispersions containing two types of spherical colloidal silica having nominal diameters of 3.0 μm and 3.2 μm were prepared and that the water dispersions were mixed at a weight ratio of 1.0:1.0 to prepare a water dispersion. Subsequently, an antireflective structure of Comparative Example 1 was obtained by using a method similar to the method in Example 1.

The antireflective structure of Comparative Example 1 was observed under an electron microscope, and a size and the like of each portion were determined by the above-described method and were as follows.

Figure 17:
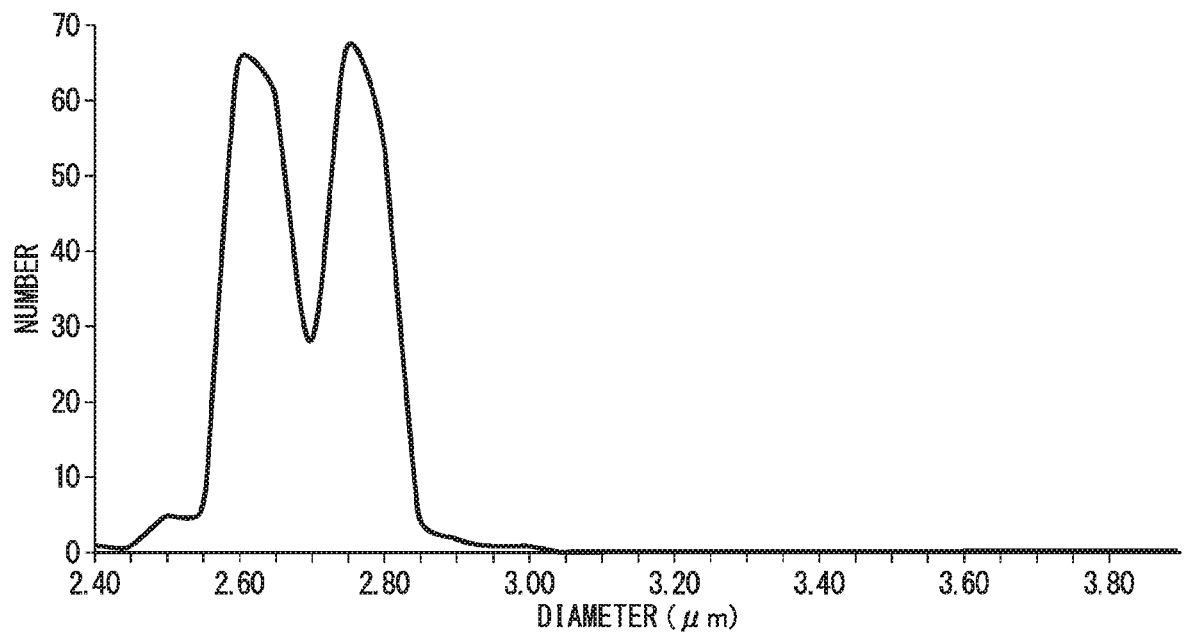
FIG. 17 is an opening diameter distribution chart of an antireflective structure produced in Comparative Example 1.

Average height of wall portions: 13.0 μm
Aperture ratio: 60.5%
Minute projection structure in bottom portion: Yes
Minute projection structure average pitch in bottom portion: 110 nm
Minute projection structure average height in bottom portion: 750 nm In addition, FIG. 17 shows an opening diameter distribution chart created by the above-described method for the antireflective structure of Comparative Example 1. Results based on the opening diameter distribution chart were as follows. The results are shown in Table 1.

Average opening diameter of opening portions (Dave): 2.72 μm
Minimum diameter in opening diameter distribution chart (Dmin): 2.60 μm
Maximum diameter in opening diameter distribution chart (Dmax): 2.80 μm $$(D\text{max}-{}_D\text{min})/D\text{ave}=0.074$$

The results described above do not satisfy Formula (2) described above.

Figure 18:
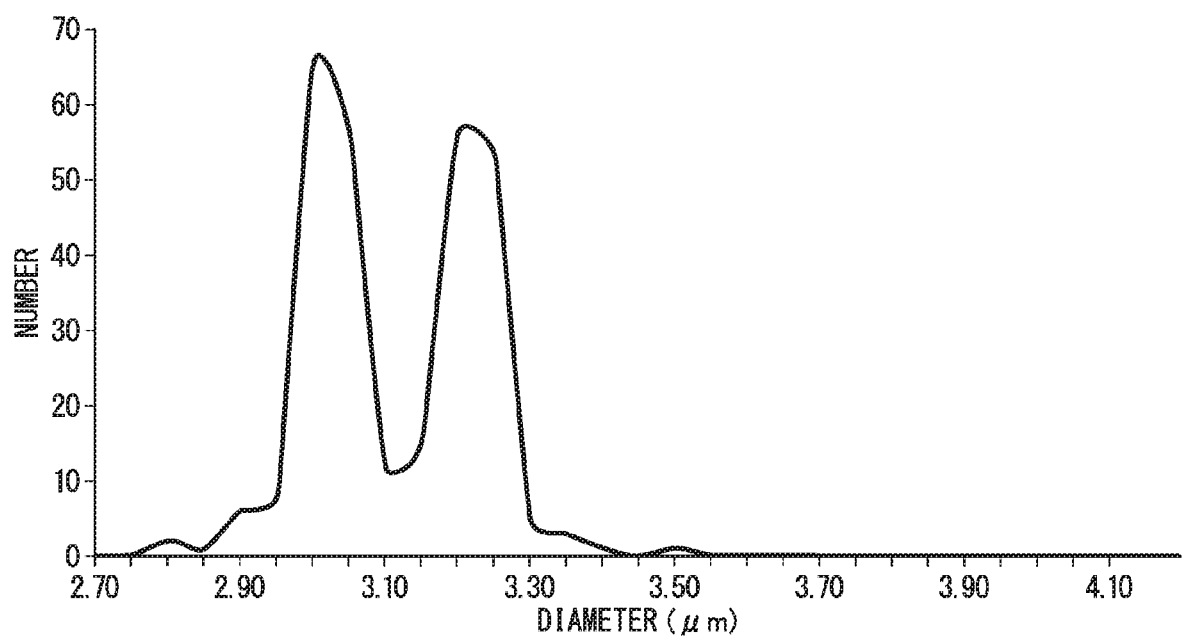
FIG. 18 is a particle diameter distribution chart of fine particles used in Comparative Example 1.

FIG. 18 shows a particle diameter distribution chart created by the above-described method for the fine particles used in Comparative Example 1. Results based on the particle diameter distribution chart were as follows.
Average particle diameter (PSave): 3.10 μm
Minimum diameter (PSmin): 2.95 μm
Maximum diameter (PSmax): 3.25 μm Comparative Example 2

A mold P of Comparative Example 2 was produced by using a method similar to the method in Example 1 except that 20 mass % water dispersions containing three types of spherical colloidal silica having nominal diameters of 3.0 μm, 3.5 μm, and 8.0 μm were prepared and that the water dispersions were mixed in a weight ratio of 1.0:1.0:1.0 to prepare a water dispersion. Subsequently, an antireflective structure of Comparative Example 1 was obtained by using a method similar to the method in Example 1.

Figure 19:
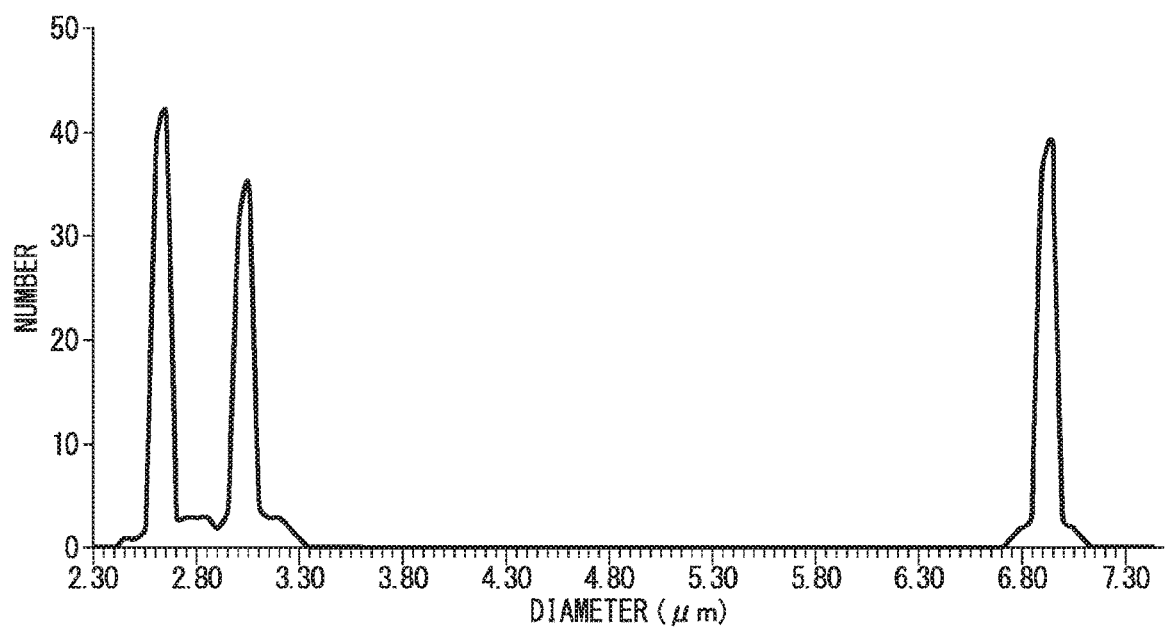
FIG. 19 is an opening diameter distribution chart of an antireflective structure produced in Comparative Example 2.

The antireflective structure of Comparative Example 2 was observed under an electron microscope, and a size and the like of each portion were determined by the above-described method and were as follows.
Average height of wall portions: 13.0 μm
Aperture ratio: 46.1%
Minute projection structure in bottom portion: Yes
Minute projection structure average pitch in bottom portion: 110 nm
Minute projection structure average height in bottom portion: 750 nm In addition, FIG. 19 shows an opening diameter distribution chart created by the above-described method for the antireflective structure of Comparative Example 2. Results based on the opening diameter distribution chart were as follows. The results are shown in Table 1.
Average opening diameter of opening portions (Dave): 4.16 μm
Minimum diameter in opening diameter distribution chart (Dmin): 2.60 μm
Maximum diameter in opening distribution chart (Dmax): 6.95 μm $$(D\text{max}-{}_D\text{min})/D\text{ave}=1.046$$

The results described above do not satisfy Formula (2) described above.

Figure 20:
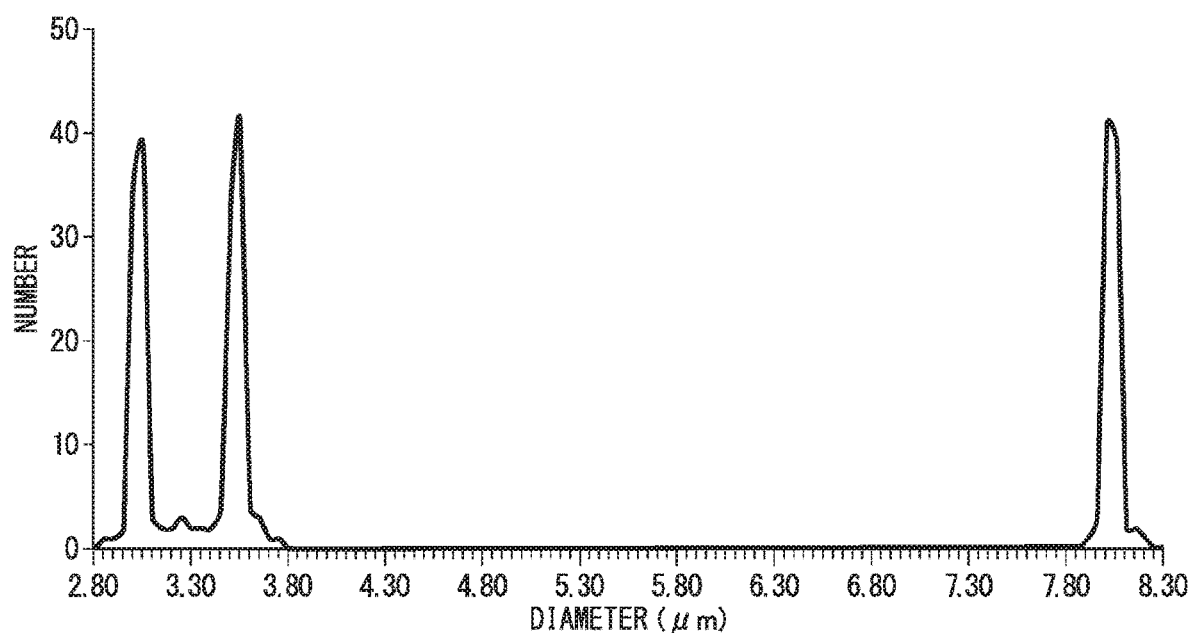
FIG. 20 is a particle diameter distribution chart of fine particles used in Comparative Example 2.

FIG. 20 shows a particle diameter distribution chart created by the above-described method for the fine particles used in Comparative Example 2. Results based on the particle diameter distribution chart were as follows.
Average particle diameter (PSave): 4.85 μm
Minimum diameter (PSmin): 3.00 μm
Maximum diameter (PSmax): 8.05 μm Evaluation of Antireflection Performance To confirm the antireflection performance of the antireflective structures produced in the example and the comparative examples, integrated reflectance (Y value (%)) obtained after vision sensitivity correction was evaluated by using a spectrophotometer V-770 manufactured by JASCO Corporation. A smaller Y value indicates lower reflectance and excellent antireflection performance

TABLE 1

| | Average opening diameter (Dave) (μm) | Minimum Diameter (Dmin) (μm) | Maximum Diameter (Dmax) (μm) | (Dmax − Dmin)/ Dave | Optical interference. (Yes/No) | Y value (%) |
|---|---|---|---|---|---|---|
| Example 1 | 3.06 | 2.60 | 3.55 | 0.310 | No | 0.38 |
| Comparative Example 1 | 2.72 | 2.60 | 2.80 | 0.074 | Yes | 1.21 |
| Comparative Example 2 | 4.16 | 2.60 | 6.95 | 1.046 | No | 0.96 |

Evaluation Results and Discussion

As the results of the above-described evaluation, in Example 1, an array of the antireflective structures had randomness, and thus optical interference due to a domain was suppressed. Further, the minute projection structure was provided in the bottom portion, and thus antireflection performance was more excellent. On the other hand, in Comparative Example 1, optical interference due to a domain caused a large Y value, and antireflection performance was poor, and in Comparative Example 2, wall defects caused a large Y value, and antireflection performance was poor.

INDUSTRIAL APPLICABILITY

The present invention can be applied widely in the field of a resin molded article such as an antireflective sheet.

REFERENCE SIGNS LIST

1 . . . Antireflective structure
2 . . . Light absorbing unit
2a . . . Outer edge portion
2b . . . Bottom portion
2c . . . Opening portion
2e . . . Opening edge
2w . . . Wall portion
2v . . . Depression
2z . . . Communication location
3 . . . Minute projection
L1 . . . Incident light ray
L2 . . . Incident light ray
A . . . Disk including resist
B . . . Fine particle
S . . . Substrate
C . . . Cylindrical body G . . . Etching gas
t . . . Projection
u . . . Substrate surface
M . . . Group of recesses and protrusions
P . . . Mold
Q . . . Cured body

What is claimed is:

1. An antireflective structure comprising a plurality of light absorbers each having an inner hollow portion and a bottomed cylindrical shape and including a bottom portion including an outer edge portion having a substantially circular shape, a wall portion rising along the outer edge portion and protruding from a surface of the antireflective structure, and an opening portion formed above the bottom portion, wherein conditions A and B are satisfied:

A an average opening diameter $D_{ave}$ calculated as an arithmetic mean of opening diameters of the light absorbers units located on two diagonal lines of five different arbitrarily set, non-overlapping squares encompassing 200 to 300 light absorbers satisfies Formula 1:

$$1\ \mu m \leq D_{ave} \leq 10\ \mu m, \quad \text{Formula 1}$$

wherein an opening diameter is a diameter of a circle having a diameter no larger than necessary to include the entire opening portion of each light absorber as measured in 0.05 μm increments;

B the average opening diameter $D_{ave}$ and a maximum diameter $D_{max}$ and a minimum diameter $D_{min}$ satisfy Formula 2:

$$0.15 \leq (D\text{max} - D\text{min})/D\text{ave} \leq 0.45 \quad \text{Formula 2}$$

where values of the maximum diameter $D_{max}$ and the minimum diameter $D_{min}$ in Formula 2 are a maximum value and a minimum value of diameters having a number of circles 10% of a number of the circles having the most frequent value as indicated in an opening diameter distribution chart for each of the circles measured in A, the opening diameter distribution chart including a horizontal axis indicating a diameter of each of the circles measured in A and a vertical axis indicating the number of the circles having the respective diameters.

2. The antireflective structure according to claim 1, wherein, in the opening diameter distribution chart, one peak is observed for the number of the smallest circles being not less than 10% with respect to the number of the smallest circles having the most frequent value.

3. The antireflective structure according to claim 1, wherein, in the opening diameter distribution chart, two or more peaks are observed for the number of the smallest circles being not less than 10% of the number of the smallest circles having the most frequent value.

4. The antireflective structure according to claim 3, wherein, with respect to the two or more peaks, a difference between the diameter at the peak having the minimum diameter and the diameter at the peak having the maximum diameter is not less than 0.3 μm and not more than 1.5 μm.

5. The antireflective structure according to claim 4, wherein an average height of the wall portion is not less than 5 μm and not more than 100 μm.

6. The antireflective structure according to claim 1, wherein, in the bottom portion, a minute projection structure having a plurality of minute projections clustered in a group at an average pitch of not less than 10 nm and not more than 500 nm is formed.

7. The antireflective structure according to claim 6, wherein an average height of the minute projections is not less than 0.1 μm and not more than 4 μm.

8. The antireflective structure according to claim 1, wherein the minimum diameter Dmin satisfies the following Formula 3, and the maximum diameter Dmax satisfies the following Formula 4

$$D\text{min} = \alpha \times D\text{ave} (\text{where } 0.75 < \alpha < 1.0) \quad \text{Formula 3}$$

$$D\text{max} = \beta \times D\text{ave} (\text{where } 1.0 < \beta < 1.3) \quad \text{Formula 4.}$$

* * * * *